(12) United States Patent
Schubert et al.

(10) Patent No.: US 7,348,096 B2
(45) Date of Patent: Mar. 25, 2008

(54) FLEXIBLE THIN PRINTED BATTERY AND DEVICE AND METHOD OF MANUFACTURING SAME

(75) Inventors: Mark A. Schubert, Brunswick, OH (US); Jing Zhang, Rochester Hills, MI (US); Guanghong Zheng, Avon, OH (US); Frank H. Feddrix, Westlake, OH (US); Richard A. Langan, Parma, OH (US); Frank B. Tudron, Westlake, OH (US); Gary R. Tucholski, North Royalton, OH (US); Abdelkader Hilmi, Danbury, CT (US); John C. Bailey, Columbia Station, OH (US); Andrew Webber, Avon Lake, OH (US)

(73) Assignee: Eveready Battery Company, Inc., St. Louis, MO (US)

( * ) Notice: Subject to any disclaimer, the term of this patent is extended or adjusted under 35 U.S.C. 154(b) by 885 days.

(21) Appl. No.: 10/321,182

(22) Filed: Dec. 17, 2002

(65) Prior Publication Data
US 2003/0165744 A1    Sep. 4, 2003

Related U.S. Application Data

(60) Provisional application No. 60/356,407, filed on Feb. 12, 2002, provisional application No. 60/356,236, filed on Feb. 12, 2002, provisional application No. 60/356,213, filed on Feb. 12, 2002, provisional application No. 60/356,406, filed on Feb. 12, 2002, provisional application No. 60/356,583, filed on Feb. 12, 2002, provisional application No. 60/356,247, filed on Feb. 12, 2002, provisional application No. 60/356,266, filed on Feb. 12, 2002, provisional application No. 60/356,584, filed on Feb. 12, 2002.

(51) Int. Cl.
*H01M 6/00* (2006.01)
*H01M 2/08* (2006.01)
*H01M 2/20* (2006.01)

(52) U.S. Cl. ...................................... 429/127; 429/185
(58) Field of Classification Search ..................... None
See application file for complete search history.

(56) References Cited

U.S. PATENT DOCUMENTS

| 4,080,728 A | 3/1978 | Buckler | 29/623.4 |
| 4,175,052 A | 11/1979 | Norteman, Jr. | 252/182.1 |
| 4,916,035 A | 4/1990 | Yamashita et al. | |

(Continued)

FOREIGN PATENT DOCUMENTS

DE    19943961 A    6/2000

(Continued)

*Primary Examiner*—Jonathan Crepeau
*Assistant Examiner*—R. Hodge
(74) *Attorney, Agent, or Firm*—Michael C. Pophal

(57) ABSTRACT

A flat, flexible electrochemical cell is provided. The within invention describes various aspects of the flat, flexible electrochemical cell. A printed anode is provided that obviates the need for a discrete anode current collector, thereby reducing the size of the battery. An advantageous electrolyte is provided that enables the use of a metallic cathode current collector, thereby improving the performance of the battery. Printable gelled electrolytes and separators are provided, enabling the construction of both co-facial and co-planar batteries. Cell contacts are provided that reduce the potential for electrolyte creepage in the flat, flexible electrochemical cells of the within invention.

4 Claims, 11 Drawing Sheets

U.S. PATENT DOCUMENTS

| | | |
|---|---|---|
| 5,035,965 A | 7/1991 | Sangyoji et al. |
| 5,055,968 A | 10/1991 | Nishi et al. |
| 5,401,590 A | 3/1995 | Chalilpoyil et al. .......... 429/59 |
| 5,652,043 A * | 7/1997 | Nitzan ........................ 428/209 |
| 5,658,684 A | 8/1997 | Lake |
| 5,747,191 A | 5/1998 | Lake |
| 5,865,859 A | 2/1999 | Lake |
| 5,906,661 A | 5/1999 | Lake |
| 6,025,089 A | 2/2000 | Lake |
| 6,030,423 A * | 2/2000 | Lake ........................ 29/623.4 |
| 6,045,942 A | 4/2000 | Miekka et al. .............. 429/124 |
| 6,379,835 B1 * | 4/2002 | Kucherovsky et al. ........ 429/11 |
| 6,884,546 B1 * | 4/2005 | Fujita et al. ............. 429/231.9 |

FOREIGN PATENT DOCUMENTS

| | | |
|---|---|---|
| EP | 0678927 A1 | 10/1995 |
| EP | 0862227 A1 | 9/1998 |
| EP | 1026767 A1 | 8/2000 |
| EP | 1096589 A1 | 5/2001 |
| JP | 58206048 | 12/1983 |
| JP | 2000319381 | 11/2000 |

* cited by examiner

FLEXIBLE THIN PRINTED BATTERY AND DEVICE AND METHOD OF MANUFACTURING SAME

RELATED APPLICATIONS

This application claims benefit under 35 USC 119(e) to the following U.S. provisional patent applications: U.S. Pat. Application No. 60/356,407, U.S. Pat. Application No. 60/356,236, U.S. Pat. Application No. 60/356,213, U.S. Pat. Application No. 60/356,406, U.S. Pat. Application No. 60/356,583, U.S. Pat. Application No. 60/356,247, U.S. Pat. Application No. 60/356,266, and U.S. Pat. Application No. 60/356,584, all filed on Feb. 12, 2002 and pending.

FIELD OF THE INVENTION

This invention relates to a flexible thin battery and device and a method for making such a battery and device. More specifically, this invention relates to a flexible thin printed battery wherein one or more of the electrodes are printed onto a flexible substrate using a printable ink, and to devices powered by such batteries.

BACKGROUND OF THE INVENTION

Flexible planar thin batteries utilizing lithium-based chemistries are known wherein the electrodes are formulated by the deposition of an active material film onto a substrate using various deposition techniques such as pulsed laser deposition, spin coating and sputtering. These techniques tend to require relatively costly and complex equipment and do not lend themselves to a high throughput inexpensive manufacturing process. Further, many devices requiring a power supply, such as novelty packaging and greeting cards augmented with audio and/or visual outputs, are manufactured on high speed web-based printing lines. Lithium-based technologies are not an attractive power source for such low cost per unit applications. The ability to produce both the device and the power supply in a single process presents opportunities for cost savings. There is therefore a need to develop an inexpensive electrochemical power supply that can be produced in a web-based process by stenciling, screen printing or other thick film application processes. As used herein, "print" and "printing" and "printable" refer to any such thick film application process whereby the layer produced is between 10 and 250 microns thick and includes both stenciling and screen printing processes.

It is therefore an object of the within invention to provide a printable zinc ink that can be printed directly onto a nonconductive substrate without the need for a distinct anode current collector.

It is a further object of the within invention to provide a printable zinc ink that can be printed directly onto a flexible nonconductive polymer substrate without the need for a distinct anode current collector.

It is a further object of the within invention to provide an electrochemical cell with a printed anode, a printed cathode current collector, a printed cathode and a printed separator/electrolyte.

It is a further object of the within invention to provide an electrochemical cell with a printed zinc anode, a printed manganese dioxide cathode and a printed metallic cathode current collector in an electrolyte comprising zinc chloride.

It is a further object of the within invention to provide an electrochemical cell with a printed zinc anode, a printed manganese dioxide cathode and a printed metallic cathode current collector in an electrolyte comprising zinc acetate.

It is a further object of the within invention to provide an electrochemical cell with an anode printed onto a first flexible polymer substrate, a cathode current collector printed onto a second flexible polymer substrate, a cathode printed directly onto the printed cathode current collector, wherein said first and second flexible polymer substrates are subsequently joined together to form a battery housing or package.

It is a further object of the within invention to provide an electrochemical cell with an anode and a cathode current collector both printed directly onto a first piece of nonconductive substrate material in a coplanar arrangement, a printed cathode printed directly onto the cathode current collector and where a second piece of substrate material is subsequently joined with the first together to form a battery housing or package.

It is a further object of the within invention to provide a carbon zinc electrochemical cell with at least one electrode printed onto a nonconductive substrate and a printable gelled polymer electrolyte that also functions as a separator.

It is a further object of the within invention to provide an alkaline electrochemical cell with at least one electrode printed onto a nonconductive substrate and a printable gelled polymer separator.

It is a further object of the within invention to provide an electrochemical cell with at least one electrode printed onto a nonconductive substrate, where said substrate forms a flexible battery housing or package and current flows between the interior of said package and the exterior of said package using discontinuous tabs in order to assure electrochemical compatibility between the external tab and the internal cell chemistry, to allow for a more robust external tab development and to reduce the potential for electrolyte leakage through the package or housing seal.

It is a further object of the within invention to provide a printable gelled zinc chloride electrolyte that is particularly suitable for use in cells having printed co-planar electrodes.

It is a further object of the within invention to provide a device powered by such a printed flexible battery and having one or more printed components.

SUMMARY OF THE INVENTION

A thin, flexible printed battery is provided comprising at least one printed electrode that can be a printed anode or a printed cathode assembly and an electrolyte contained within a sealed housing or package and further comprising external contacts or tabs to provide current from the battery to the battery powered device. The electrode assembly can incorporate either a coplanar or a cofacial electrode arrangement.

The external contacts for the battery preferably have a first terminal end external to the battery package and a second terminal end positioned within the seal area of the battery package. Such an external contact will be referred to herein as discontinuous in the seal area of the housing or package. Current travels between the electrode and the external contact by way of a distinct internal current collector having a terminal end also positioned within the seal area of the battery pack. The internal current collector can be a material distinct from the electrode or can alternately comprise a portion of the electrode itself where the electrode is sufficiently conductive.

The anode comprises a zinc ink printed directly onto a nonconductive substrate and is sufficiently conductive so as to eliminate the need for a distinct anode current collector. The cathode assembly comprises a printed cathode current collector and a cathode printed directly onto the printed cathode collector. The cathode current collector in a carbon zinc cell comprises a conductive carbon ink printed directly onto the nonconductive substrate, or, alternatively, silver ink particles printed onto the substrate and then coated with a conductive carbon film. In a cell with an alkaline electrolyte or an acetate electrolyte, the collector can be silver ink or another conductive metal ink. The electrolyte is chosen based on the electrode materials utilized, and can be an aqueous zinc chloride solution, a Leclanche electrolyte, an alkaline solution, or an aqueous solution of zinc acetate.

The nonconductive substrate for the anode ink and the cathode current collector is preferably a flexible nonconductive polymer material that can be joined together to form a battery package or housing. Various aspects of the printed battery of the within invention can be utilized in alternate cell chemistries without departing from the scope of the within invention.

DESCRIPTION OF THE PREFERRED EMBODIMENT

Figure 1A:
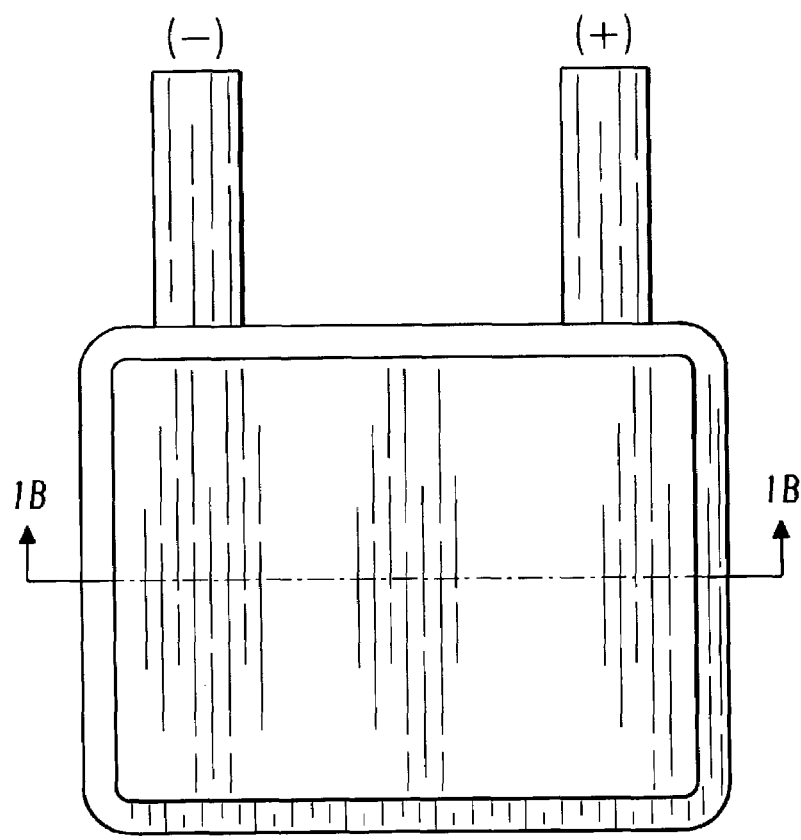
FIG. 1A is an electrochemical cell according to the within invention.
Figure 1B:
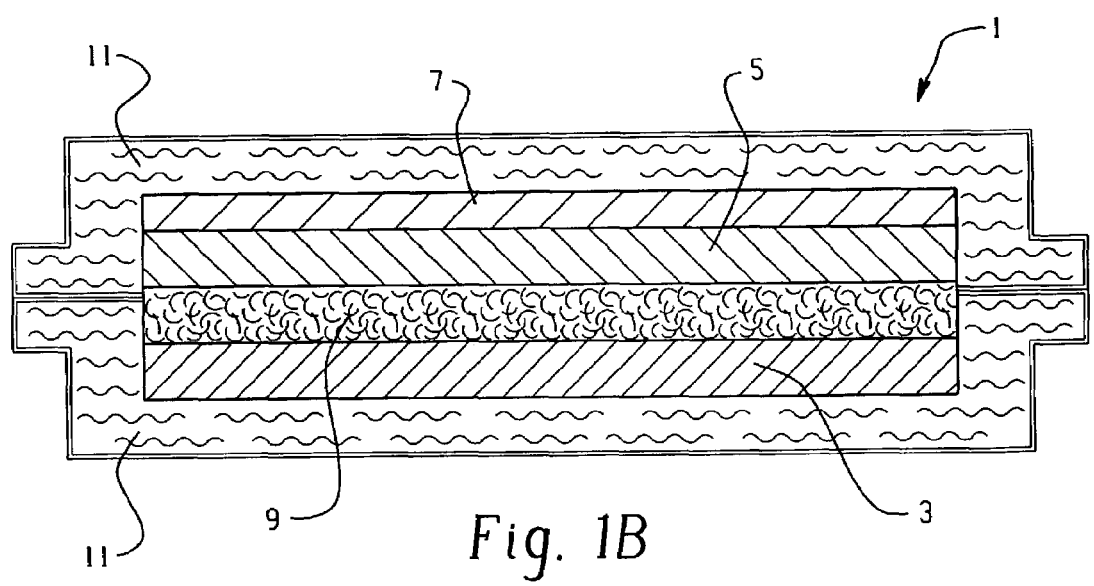
FIG. 1B is a cross sectional view of FIG. 1A as indicated.

Components of the thin flexible printed battery 1 of the within invention include a printed anode 3, a printed cathode 5, a cathode current collector 7, a separator 9 and an aqueous electrolyte contained within a flexible thin battery package, housing or enclosure 11. See FIG. 1A and FIG. 1B.

The Anode

We have discovered that an effective, conductive, aqueous zinc ink can be formulated and printed directly onto the surface of a nonconductive without the necessity of first printing an anode current collector or otherwise supplying a conductive substrate to function as a discrete anode current collector. As used herein, the term "aqueous" means that water is utilized as at least one solvent in the anode ink formulation. We have discovered that the presence of excess zinc +2 cations enables a low resistance, high conductivity printable zinc ink. In a carbon zinc cell of the within invention, that is a cell using an electrolyte comprising zinc chloride, the source of excess zinc +2 cations is an aqueous solution of zinc acetate ($Zn(OOCCH_3)_2 \cdot 2H_2O$) such as is available from, for example, Fisher Scientific, product designation Z20. While not wanting to be bound by theory, it is believed that the source of excess zinc +2 cations changes the conformation and aggregation of the polymer binder used in the ink formulation so that the polymer is less likely to form an insulating layer on the zinc particles, thereby improving the zinc particle to particle contact. In such a carbon zinc embodiment of the within invention, a polyvinylpyrrolidone (PVP) binder is preferred, preferably with a molecular weight of 2.2 to 2.8 million. Zinc nitrates and zinc sulfates are not appropriate sources for excess zinc cations since they are strong oxidants and will oxidize the zinc. Zinc chloride and other zinc halides are not appropriate sources of excess zinc cations in such a zinc ink formulation for use in a zinc chloride electrolyte since the PVP binder will not dissolve so as to form a uniform dispersion in a zinc chloride solution. Zinc acetate is therefore a preferred source of excess zinc cations in the zinc ink formulation for use in a zinc chloride electrolyte since the PVP binder does form a uniform dispersion in a zinc acetate solution.

In an alkaline cell, that is a cell using an alkaline electrolyte such as a potassium hydroxide solution, the source of excess zinc +2 cations for the anode ink is preferably zinc chloride. This ink formulation preferably utilizes a polyethylene oxide (PEO) binder, preferably with a molecular weight of about 600,000, which is soluble in a zinc chloride solution but not in a typical alkaline electrolyte.

The zinc powder of the zinc anode ink is commercially available from such sources as Big River Zinc, Union Miniere or Noranda, and is preferably alloyed with from 500 to 1600 ppm lead. Alternatively, the zinc is BIA zinc (a bismuth, indium and aluminum alloy) commercially available from zinc suppliers such as Noranda. The zinc anode ink of the within invention uses very fine zinc powder, or dust. The zinc dust preferably has a Microtrac particle size $d(50)$ value of from 10 to 60 microns and is dimensioned such that the powder will pass through a 270 mesh sieve (USA standard). As a rule of thumb, the $d(50)$ value should not exceed one half of the desired ink layer thickness. Thus, if a desired ink layer thickness is 50 microns, the d(50) value of the powder component should in general not exceed 25 microns.

Other components of the preferred zinc ink in the carbon zinc electrochemical cell embodiment of the within invention include an appropriate binder that is compatible with the cell chemistry, including the cell electrolyte. In the carbon zinc embodiment of the within invention, an aqueous solution of polyvinylpyrrolidone (PVP) having a molecular weight of 2.0 to 4.0 million is utilized in conjunction with a source of excess zinc +2 ions, such as zinc acetate, as disclosed above. PVP is soluble in a zinc acetate solution but not in traditional carbon zinc electrolytes such as zinc chloride and ammonium chloride. PVP is commercially available from ISP Technologies, Inc. Wayne, N.J., product designation PVP-K120. In an alkaline electrolyte, the preferred binder for the zinc ink is a polyethylene oxide (PEO) with a preferred molecular weight of between 500,000 and 700,000 and most preferably 600,000.

One concern with a PVP binder in an aqueous solution is that the resulting ink may result in high surface tension, high polarity and fast drying, particularly in a low humidity environment, as well as the generation of hydrogen gas resulting from the zinc corrosion reaction with water. We have discovered that a co-solvent system employing an aprotic solvent miscible with water and having a higher boiling point than water will result in the reduction of the surface tension of the ink, a decrease in the polarity of the ink, a decrease in the ink drying rate and a decrease in gassing. The preferred co-solvent in the zinc acetate based zinc ink described herein is N-methyl pyrrolidone (NMP), available from Honeywell Burdick & Jackson, Muskegon, Mich., catalog number 304-1. NMP is soluble in an aqueous solution of zinc acetate.

In addition to a binder and solvent system, the zinc ink of the within invention can further include other cell additives to produce beneficial performance attributes. For example, the relatively fine particle size of the zinc employed in the zinc ink of the within invention results in increased gassing. A surfactant known to reduce gassing in alkaline cells has both a phosphate group and polyethylene oxide and/or polypropylene oxide chains. Such a surfactant is available commercially under the Union Carbide tradename Triton QS-44. We have discovered that surfactants of this type are even more beneficial in controlling gassing in acidic electrolytes such as LeClanche or zinc chloride electrolytes. As used herein, a "LeClanche electrolyte" is an electrolyte containing both zinc chloride and ammonium chloride.

Once the zinc ink has been formulated, it can then be screen printed or stenciled directly onto a flexible polymer substrate. The zinc ink of the within invention has sufficient conductivity so as to obviate the need for a distinct anode current collector to be printed or otherwise placed into contact with the anode formed from the zinc ink of the within invention. The anode formed from the zinc ink of the within invention maintains conductivity during the discharge even though the zinc is being consumed. The anode tab that forms the negative terminal external to the cell housing is directly connected with the zinc ink of the within invention, rather than being in electrical contact with a distinct anode collector.

The preferred substrate material is a flexible nonconductive polymer material that will be used to house the battery in a flexible package. Such a material is available as a laminate from Pharma Center Shelbyville, product designation 95014, with an ethylene acrylic acid heat sealable layer that forms the interior surface of the package. One of skill in the art will appreciate that the anode ink and the cathode current collector ink can also be printed directly onto other nonconductive materials that may or may not be flexible and may or may not form the battery package or housing. The surface upon which the anode ink and the cathode collector ink are applied will be the surface that ultimately is positioned within the battery package or housing. Such surfaces, in addition to providing a heat sealable surface can alternatively supply a pressure sealing surface, an epoxy sealing surface or other means of joining material together. Laminates which are constructed of a metal foil surrounded by a protective polymer on the outer side or surface and a heat or pressure sealable polyethylene or polypropylene on the opposing inner side are commonly available. Such laminates can be obtained from, for example, Pharma Center Shelbyville, Inc. of Shelbyville, Ky. under the product designation 95014, Dai Nippon Printing Co., Ltd. of Tokyo, Japan under the product designation D-EL40E, and also, Sumitomo Electric Industries, Ltd. of Tokyo, Japan under the product designation L-NY-Al-TRPP-L. Alternatively, a laminate with an ethylene methacrylic or polyethylene methacrylic acid heat-sealable layer is made by Ludlow Coated Products of Homer, La. The appropriate laminate and associated sealing layer will be selected on the basis of, among other factors, the type of electrolyte to be used, as is known in the art. The impervious metallic foil layer can be any variety of metals such as, for example, aluminum, nickel, copper and stainless steel. The protective polymer layer is preferably a polyester or nylon, but other polymeric materials such as a polypropylene or a polyethylene could also be employed in this layer.

In the case of screen printing, it will be important to determine the optimum mesh opening for good printability of the ink, as is known in the art. Factors to consider include the particle size of the zinc, the ink viscosity and other flow properties under shear and the required thickness of the ink necessary to achieve sufficient capacity.

The Cathode Assembly

The cathode assembly of a carbon zinc cell according to the within invention (current collector and electrolytic manganese dioxide, or EMD, active material) is printed onto a flexible substrate to which the cathode current collector ink will adhere with minimal or no cracking, preferably onto the sealable surface of a flexible packaging material that will be used to house the battery. Such a flexible battery housing laminate material is available for example from Pharma Center Shelbyville, product designation number 95014, as described above.

First, a current collector is deposited onto the flexible polymer using a stencil, a screen or other suitable printing apparatus. The sealing surface of the laminate material is used as the printing surface, i.e. that surface of the material that will end up being positioned within the battery package or housing. The cathode current collector ink is preferably an ink formulated from materials sufficient to transfer electrons generated in the reduction of the cathode during discharge. The appropriate cathode current collector material will be selected based on the materials utilized in the cell, to maximize current transfer while minimizing undesirable reactions with other cell component materials, as is known in the art. In a carbon zinc cell according to the within invention using an EMD cathode, the cathode current collector is preferably a carbon ink such as is available from Acheson Colloids under product designation PF407C. Still more preferably, the carbon ink utilizes a solvent system devoid of functional alcohol units to prevent unintended reduction of the manganese dioxide cathode material, and to avoid extended curing periods. Such an ink is commercially available from Acheson Colloids under product designation PM 024, and avoids extended curing periods of the ink in a vacuum environment. The printed collector is then subjected to suitable curing to assure adequate drying and solvent evaporation.

Cells having screen printed cathode collectors of various thicknesses using PF407C ink were evaluated to determine the minimum collector thicknesses for a given application. The cells had stenciled EMD cathodes and screen printed zinc anodes of 112 to 125 microns (dry), achieved with multiple screen passes. The cathode collectors were dried at 50° C. under a 0.2 Torr vacuum for 16 hours. The cells were then discharged under the test protocols described below for 100 cycles, and the cells still had a closed circuit voltage of greater than 0.9 volts. The results for a co-planar electrode assembly are presented in Table I and for a co-facial electrode assembly are presented in Table II:

TABLE I (co-planar electrodes)

| Test | Minimum required cathode current collector thickness |
|---|---|
| 100 cycles (1 cycle = 6 sec. at 2 mA and 60 sec. off) | 12 microns |
| 100 cycles (1 cycle = 16 sec. at 8 mA and 60 sec. off) | 70 microns |

TABLE II (co-facial electrodes):

| Test | Minimum required cathode current collector thickness |
|---|---|
| 100 cycles (1 cycle = 6 sec. at 2 mA and 60 sec. off) | 6-8 microns |
| 100 cycles (1 cycle = 16 sec. at 8 mA and 60 sec. off) | 24-30 microns |

The resistance of these collectors and their resulting performance are a function of the drying conditions utilized.

As noted above, carbon inks with high boiling point alcohol solvents require undesirable drying protocols to remove the solvent. A carbon ink has been developed for use as a cathode current collector in a zinc chloride or a Leclanche electrolyte that has acceptable conductivity without a complicated drying regimen. The current collector ink wet formulation comprises 8 to 10 weight percent of a styrene-ethylene-butylene-styrene (SEBS) block copolymer such as Kraton G1650 as is commercially available from Shell, 34 to 38 weight percent graphite such as KS6 available from Timcal America, product designation Timrex LB 1099, and the remainder being toluene or trichloroethylene solvent. Conductivity can be enhanced by the addition of carbon black in low (<5 weight percent) amounts. Other block co-polymers in the Kraton line are also suitable as binders for this ink, including styrene-butadiene-styrene materials.

Cells using this cathode current collector ink were evaluated. A 0.003 inch leaded zinc foil was used as the anode. The cathode collector and the cathode were both stenciled. The cathode dry formulation was 90 weight percent manganese dioxide, 2 weight percent Carbopol 940 and 8 weight percent KS6 graphite. The current collector wet ink formulation was 10 weight percent Kraton G1650, 34 weight percent graphite and 56 weight percent toluene. The dry thickness of the collector was between 100 and 125 microns. The cells were discharged for 100 cycles, where a cycle is defined as an 8 mA current for 16 second followed by a 60 second rest. The cell voltage remained above 0.9 volts.

A metallic current collector will be more conductive than a carbon current collector, but will react with the manganese dioxide in a zinc chloride electrolyte. We have discovered that by coating a conductive metal or metallic ink such as silver, silver ink or aluminum with a protective conductive carbon film, the benefits of a metallic current collector can be achieved without the disadvantages of reactivity in a zinc chloride or a Leclanche electrolyte. The protective carbon coating preferably consists of a mixture of graphite such as KS6 (20-25 weight percent), an SEBS block co-polymer such as Kraton G1650 (15-18 weight percent) and toluene (56-62 weight percent). Alternatively, the protective conductive carbon coating formulation can utilize carbon black (5-10 weight percent) with Kraton G1650 (15-18 weight percent) and toluene (72-75 weight percent). Other block co-polymers in the Kraton line are also suitable as binders for this protective coating ink, including styrene-butadiene-styrene materials.

Cells were evaluated using anode current collectors and cathode current collectors of silver ink with a printed protective conductive carbon ink. A silver ink was applied to the sealing surface of the flexible laminate packaging material such as described above and was cured at 70° C. for one to two hours to a thickness of around 30 to 40 microns. The protective coating ink formulation was 18 weight percent Kraton 1650, 22 weight percent KS6 and 60 weight percent toluene, and was stenciled onto the silver and cured to a thickness of about 100 to 120 microns. The entire exposed surface of the silver ink was covered. Zinc anode inks as described in Table III and electrolytic manganese dioxide cathode inks as described in Table IV were then stenciled onto these protected silver collectors. The cells were assembled with a resulting interfacial surface area of 39 millimeters×37 millimeters using a suitable separator and a 28 weight percent ammonium chloride+12 weight percent zinc chloride electrolyte and the housing was heat sealed.

TABLE III (ANODE DRY FORMULATIONS):

| | ZiNC[1] (weight percent) | BINDER (weight percent) |
|---|---|---|
| FORMULATION #1 | 99.0 | 1.0 methyl cellulose |
| FORMULATION #2 | 98.0 | 2.0 PVDF |

[1]seived through a 270 mesh screen, 500 ppm leaded zinc

TABLE IV (CATHODE DRY FORMULATIONS):

| | MnO2 (weight percent) | BINDER (weight percent) | GRAPHITE[1] (weight percent) |
|---|---|---|---|
| FORMULATION #1 | 90 | 2.0 methyl cellulose | 8.0 |
| FORMULATION #2 | 90 | 2.0 Carbopol 940 | 8.0 |

[1]KS6

The cells were cathode limited and had stable open circuit voltages as demonstrated in Table V below and discharged at 10 mA continuous to a cutoff voltage of 0.9 volts with about 35 to 40 percent cathode efficiency.

TABLE V (STABILITY TESTS):

|  | OCV (volts) 1 day | OCV (volts) 32 days | OCV (volts) 62 days |
|---|---|---|---|
| Cell 1 | 1.750 | 1.681 | 1.665 |
| Cell 2 | 1.755 | 1.674 | 1.650 |
| Cell 3 | 1.766 | 1.673 | 1.653 |

Once an appropriate collector is printed onto the substrate, the cathode ink is then printed onto the printed current collector. The cathode ink formulation is a mixture of EMD, binder and conductor in an aqueous or a non-aqueous solvent. The EMD powder utilized will depend on the targeted electrode thickness, desired discharge efficiency and intended application for the cell. Non-milled EMD with a d(50) of around 40 microns is unsuitable for a printed cathode with a targeted thickness of 50 microns or less. EMD with a d(50) measurement of around 1 micron can be obtained by jet-milling the EMD. Such a process is available from, for example, Sturtevant, Inc. in Hanover Mass.

Figure 15:
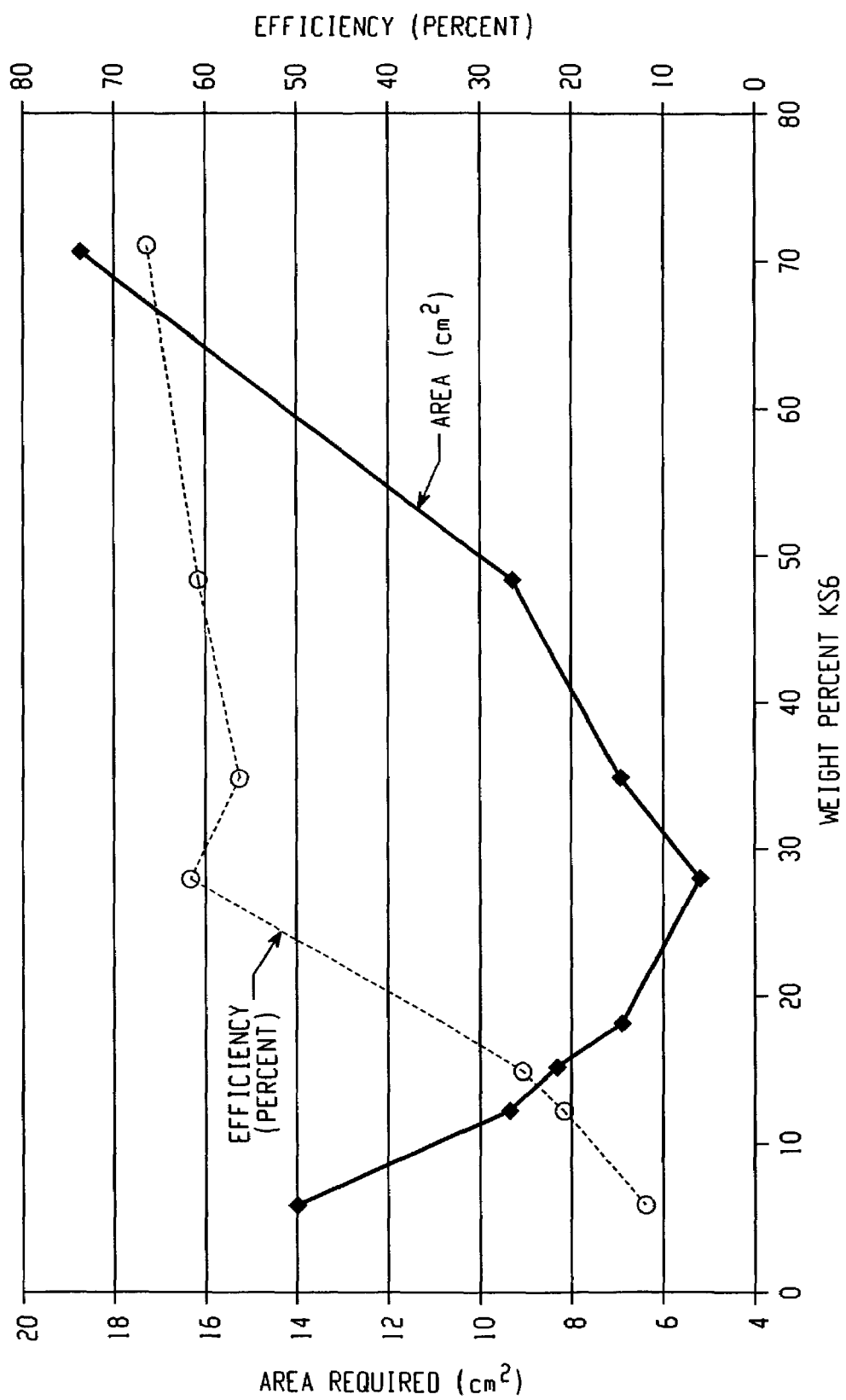
FIG. 15 is a plot of required cathode area and discharge efficiency as a function of the weight percent of graphite for an aqueous based cathode ink at a given cathode thickness.
Figure 16:
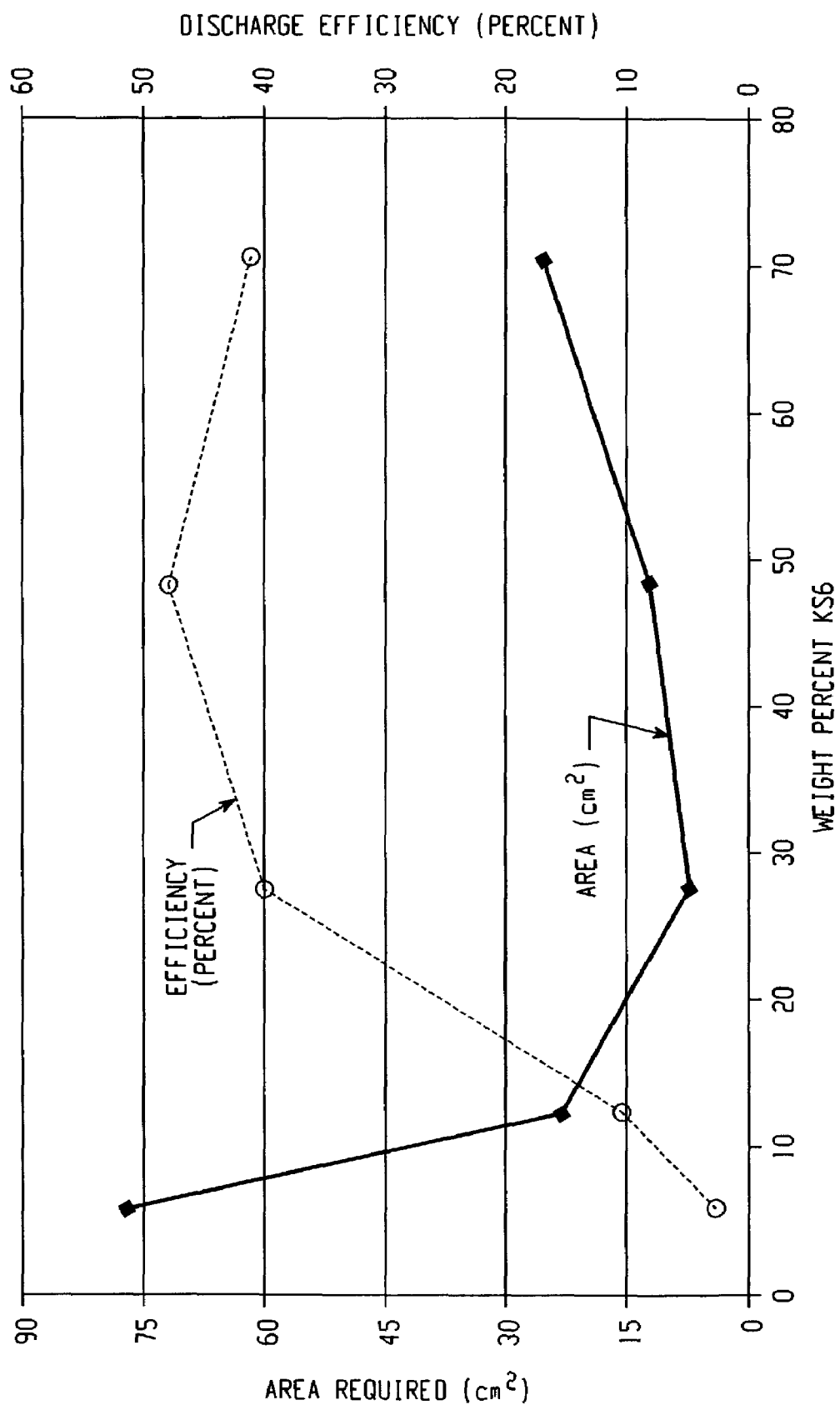
FIG. 16 is a plot of required cathode area and discharge efficiency as a function of the weight percent of graphite for a non-aqueous based cathode ink for the same cathode thickness.

However the relatively poor rate capability of jet-milled EMD can require an excessively large electrode area or thickness or both for a given application. We have discovered that for a given cathode ink formulation and thickness and a desired discharge current there is a relationship between the amount of graphite used in the ink formulation, the discharge efficiency of the electrode and the required electrode area. Thus, for example, if we were to target a 50 micron thick electrode using an aqueous cathode ink comprising jet-milled EMD and a PVP binder in a cell with a targeted discharge current of 8 mA, a graphite content of between 12 weight percent and 49 weight percent (dry formula) results in a printed cathode with an optimum area and discharge efficiency. Where concerns of electrode area dominate discharge efficiency concerns, a graphite content of from about 19 weight percent to 35 weight percent (dry formula) should be utilized. See FIG. 15 (data predicted by model developed from actual cells). The preferred conductive graphite is KS6 synthetic graphite as is available from Timcal America, product designation Timrex LB 1099. For the same cell thickness using a nonaqueous cathode ink formulation with a PVDF binder and the same targeted discharge current, a graphite content of from about 12 weight percent to 70 weight percent (dry formula) is preferred. Where concerns of electrode area dominate discharge efficiency concerns, a graphite content of from about 28 weight percent to about 49 weight percent should be utilized. See FIG. 16 (data predicted by model developed from actual cells).

A preferred nonaqueous wet cathode ink formulation is 1.0 to 2.0 weight percent PVDF, 4.0 to 45.0 weight percent graphite and 17.0 to 66.0 weight percent EMD and 28.0 to 37.0 weight percent NMP solvent. An even more preferred formulation is 1.0 to 2.0 weight percent PVDF, 12.0 to 31.0 weight percent graphite and 31.0 to 51.0 weight percent EMD and 34.0 to 35.0 weight percent NMP solvent. A preferred aqueous wet cathode ink formulation is 1.0 to 4.0 weight percent PVP, 6.0 to 25.0 weight percent graphite and 25.0 to 43.0 weight percent EMD, balanced with water. Even more preferred is 1.5 to 2.0 weight percent PVP, 11.0-16.0 weight percent graphite and 33.0 to 38.0 weight percent EMD, balanced with water.

The cathode ink is prepared by pre-dissolving the binder in water, grinding the solid components together (EMD and conductive additive) and adding the solids to the binder solution. The mixture is stirred and then is printed onto the existing current collector. The cathode is then cured at a slightly elevated temperature for a time sufficient to dry the ink and drive off the solvents.

Separator and Electrolyte

For co-facial electrode assemblies, a separator is necessary to electrically isolate the electrodes while still enabling the flow of ions, as is known in the art. The separator can be a paper separator, a gelled separator or a printed separator. In a carbon zinc embodiment of the within invention using an electrode assembly with a co-facial arrangement, a coated kraft paper separator can be utilized as a separator. As an example, a suitable separator base paper is available commercially from Munksjo #300542 (57 g/m$^2$) and is preferably coated to a level of 20 grams per square meter (gsm) (dry) with a mixture having a dry coating composition of starch (preferably 83.6 weight percent, commercially available from, for example, Roquette LAB2469), gel (preferably 7.9 weight percent, commercially available from, for example, Courtaulds B1209), PVP (preferably 2.1 weight percent), and surfactant additive (preferably 1.4 weight percent ethyl tallow amine known commercially as Crodamet) and water (5.0 weight percent). Appropriate coated kraft paper separators are described, for example, in EP 0832502 B1, WO 96/38869, WO 98/07204, U.S. Pat. No. 6,221,532 and WO 99/35700. The disclosure of U.S. Pat. No. 6,221,532 is incorporated by reference as if fully rewritten herein. Other suitable separator materials can be used in cells according to the within invention without departing from the scope of the within invention.

For a carbon zinc cell embodiment according to the within invention, the electrolyte is preferably an aqueous solution of zinc chloride, as is known in the art. Additives to prevent or reduce gassing and to encourage other performance attributes can be used, such as cetyltrimethylammonium bromide (available commercially as Cetrimide) and lead chloride. Cetyltrimethylammonium bromide is available from Aldrich, product number 855820. Cetrimide can also be introduced into the cell in a variety of ways, such as in the electrode ink formulations or as a component of a separate coating printed or otherwise applied to an electrode or separator paper surface.

We have further discovered an alternative gelled electrolyte for use in a carbon zinc printed cell of the within invention that is particularly beneficial in reducing the internal resistance of cells having coplanar electrodes. We have discovered that the addition of nonionic or anionic derivatives with natural guar gum to an aqueous zinc chloride solution produces such a gelled electrolyte. The preferred additive is Galactasol A4 available commercially from Aqualon Company in Wilmington Del.

Cells were made using 0.003 inch thick×6 millimeter wide zinc foil (500 ppm lead) anodes and printed cathodes in a co-planar construction to compare their performance in a standard zinc chloride electrolyte versus the gelled Galactasol electrolyte. The cathode collector in all four cells was the Acheson PF407C carbon ink. The cathode dry formulation by weight was 2 percent PVP, 28 percent KS6 and 70 percent jet-milled Chemetals EMD. The gelled electrolyte cells used a mixture of 6 weight percent Galactasol in a 28 weight percent zinc chloride solution. The gelled electrolyte was made by gradually adding a 6 weight percent Galactasol solution to a 28 weight percent zinc chloride solution contained in a beaker. The solution was stirred with a magnet bar and then the gelled electrolyte was left at room temperature overnight to let the trapped air escape. The control cells used a coated kraft separator paper soaked in a 28 weight percent zinc chloride solution. The cells were subjected to a cycled discharge regimen where a cycle was defined as a discharge at 2 mA for six seconds and 0 mA for 60 seconds, and were discharged until they reached a cutoff voltage of 0.9 volts. Table VI further describes the cell inputs and performance data.

TABLE VI

| Cell | Cathode thickness (microns) | Cathode weight (gm) | Cathode input (mAh) | Electrolyte | Electrolyte weight (gm) | Cycles | Utilization |
|---|---|---|---|---|---|---|---|
| 1 | 78 | .147 | 28.71 | Gelled | .65 | 6260 | 73% |
| 2 | 116 | .175 | 34.18 | Gelled | .65 | 7290 | 71% |
| 3 control | 115 | .135 | 26.37 | Liquid | .60 | 3680 | 47% |
| 4 control | 113 | .178 | 34.76 | Liquid | .60 | 5010 | 48% |

The gelled electrolyte cells performed significantly better during this test.

We have further discovered that a low molecular weight polyethylene glycol (PEG) based polymer dissolved in a zinc chloride solution and crosslinked via UV exposure leads to a gelled material that can be printed directly onto a printed electrode in a carbon zinc cell according to the within invention. The preferred polymer is a polyethylene glycol diacrylate as is available from, for example, Sartomer Company, Exton Pa. The PEG diacrylate material of the within invention has the following structure:

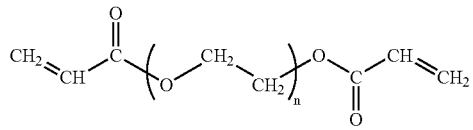

where n is greater than 3 and less than 100. The preferred molecular weight range of the PEG diacrylate material is greater than 300 and less than 4500 and still more preferably has a molecular weight of between 700 and 800. In one gel formulation according to the within invention, SR610 available from Sartomer, with a molecular weight of 742, is used. The gel formulation preferably further includes a photoinitiator, a viscosifier and a surfactant in the following weight percent ranges: PEG diacrylate—5.0 to 25.0 percent, polymer binder viscosifier—1.0 to 10.0 percent; photoinitiator—0.10 to 2.0 percent; surfactant—0.01 to 2.0 percent, combined in a 28.0 weight percent zinc chloride solution.

High molecular weight (600,000 Daltons) PEO was added to a PEG diacrylate/$ZnCl_2$ aqueous solution according to the following formulation where the solvent was 28 wt. % $ZnCl_2$ (wt. % listed below)

10% SR610 PEG diacrylate
6% 600,000MW PEO
0.5% Irgacure 184
0.1% Triton QS 44
83% electrolyte (28% $ZnCl_2$)

This formulation was mixed by slow rotation to avoid degradation of the high MW PEO with high shear mixing. The solution viscosity of this formulation at 5 rpm was 10,800 cP. After curing in air with UV black light for 15 seconds, the ionic conductivity of the film in 28% $ZnCl_2$ was 30 mS/cm, compared to 35-40 mS/cm for the traditional carbon zinc separator paper soaked in $ZnCl_2$. The electrolyte content of the traditional separator paper upon equilibrium was 75%.

Uncured solution was placed on a thin printed cathode provided via stencil printing. The solution was cured as above and the cell impedance of a co-facial cell with this separator was 48 mΩ. This value is in line with cells made with the traditional carbon zinc coated separator paper.

An alternate formulation improves the screen printing characteristics of the resulting solution by using a viscosifier with a low extensional viscosity, so that the solution will break cleanly away from the screen. Replacing the polymer binder with a non-polymeric thixotropic gelant such as fumed silica produces such solution and obviates the need for a surfactant. The preferred formulation in weight percent for this low extensional viscosity formula is: PEG diacrylate—3.0 to 25.0 percent, fumed silica viscosifier—1.0 to 10.0 percent; photoinitiator—0.10 to 2.0 percent, combined in a 28.0 percent zinc chloride solution. When fumed silica is added to 28% $ZnCl_2$ at 5% by weight, a thick gel is formed that has very good screen printing "break away" properties. The formulation below (in 28% $ZnCl_2$) produced films after 15 seconds of UV curing with black light in air.

5% Aerosil 200VS fumed silica
10% SR 610 PEG diacrylate
0.5% Irgacure 184
84% electrolyte (28% $ZnCl_2$)

The ionic conductivity of these films was 105 mS/cm. The fumed silica requires high energy mixing to gel due to the compacted nature of the VS Aerosil.

Figure 14:
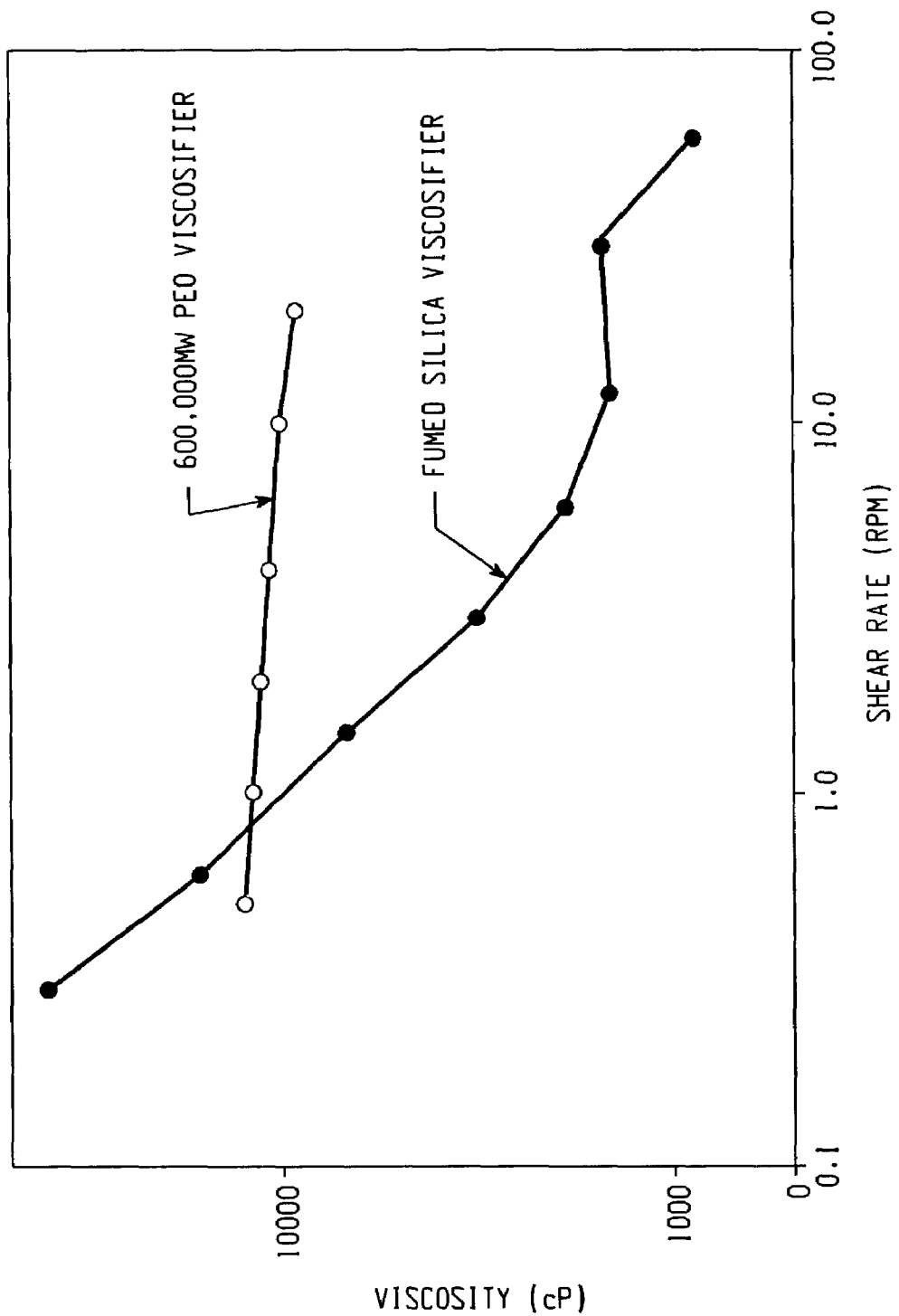
FIG. 14 is a graph comparing the thixotropic properties of a polymer electrolyte using polyethylene oxide versus fumed silica as a viscosifying agent.

FIG. 14 shows a comparison of the thixotropic behavior of the PEO and fumed silica gelled polymer electrolytes. The fumed silica is a much better thixotrope than PEO. The viscosity of the fumed silica shows a much larger dependence on shear rate than does PEO. This behavior results in the clean breakaway properties of the fumed silica formulation, advantageous for screen printing. Further, a surfactant was not required with the fumed silica formulation.

We have discovered that alternative electrolyte solutions can also be utilized with printed zinc anodes and printed EMD cathodes that will enable more robust and conductive cathode current collectors to be utilized. For example, a 1.4 to 3.0 molar concentrated solution of zinc acetate with a pH of about 6.5 to 7 can be utilized as an electrolyte according to the within invention. In this pH range, silver will not react with the manganese dioxide cathode, enabling the use of a silver ink as a cathode current collector and an anode current collector. Silver is a very conductive metal and therefore highly desirable as a current collector material. Such a silver ink is available from, for example, Ercon, Inc., Waltham, Mass., product designation E1660-136. While zinc acetate is the preferred acetate, ammonium acetate may also be used as an electrolyte in this system. When using a zinc acetate or ammonium acetate electrolyte, the preferred EMD cathode ink binder is polyvinylidene fluoride (PVDF) such as is available from Kureha product number 1100, to enhance the integrity of the cathode in the electrolyte.

In an alkaline system using an alkaline electrolyte such as a standard potassium hydroxide solution, a gelled separator has been discovered. Thus, the present invention provides a primary electrochemical cell comprising at least one printed electrode, where the electrodes are separated by a separator which is electrically insulating but ionically conducting, characterised in that the separator comprises a copolymer of: (1) an ethylenically unsaturated carboxylic acid of formula (I):

(where: $R^1$, $R^2$ and $R^3$ are the same as or different from each other and each represents a hydrogen atom, an alkyl group having from 1 to 10 carbon atoms or an aryl group; and A represents a direct bond or an alkylene group having up to 8 carbon atoms) or a salt or ester thereof; and (2) an aromatic compound of formula (II):

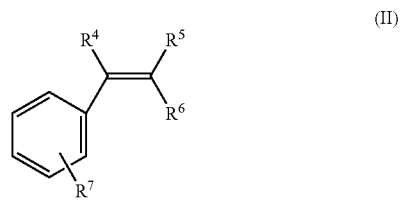

(where: $R^4$, $R^5$ and $R^6$ are the same as or different from each other and each represents a hydrogen atom, an alkyl group having from 1 to 10 carbon atoms or an aryl group; and $R^7$ represents a sulphonate or carboxylate group and balancing cation) or the separator comprises a homopolymer of said aromatic compound of formula (II).

The homo- or co-polymer may be used by itself as a separator, in which case it is preferably used to form the separator in situ in the cell, or it may be used as a coating on a porous substrate (for example traditional separator paper), or it can be applied directly to a printed electrode by printing or coating techniques in accordance with the within invention.

The invention thus also provides a process for assembling a primary electrochemical cell in which: an anode or a cathode is inserted into a battery housing; a separator is formed on said anode or cathode by applying, e.g. by spraying or printing, a solution or dispersion of said homopolymer of said aromatic compound of formula (II) or said copolymer of said acid of formula (I) or salt or ester thereof and said aromatic compound of formula (II) thereon and depositing said homopolymer or said copolymer from said solution or dispersion; and completing the electrochemical cell.

The invention further provides a primary electrochemical cell comprising an anode and a cathode separated by a separator comprising a porous film of said homopolymer of said aromatic compound of formula (II) or said copolymer of said acid of formula (I) or salt or ester thereof and said aromatic compound of formula (II).

The invention still further provides a process for assembling a primary electrochemical cell in which there are inserted into a battery housing an anode, a cathode and a separator comprising a porous film of said homopolymer of said aromatic compound of formula (II) or said copolymer of said acid of formula (I) or salt or ester thereof and said aromatic compound of formula (II) located between the anode and the cathode and completing the cell.

Where $R^1$, $R^2$, $R^3$, $R^4$, $R^5$ or $R^6$ represents an alkyl group, this may be a straight or branched chain group having from 1 to 10 carbon atoms, and examples include the methyl, ethyl, propyl, isopropyl, butyl, isobutyl, sec-butyl, t-butyl, pentyl, isopentyl, neopentyl, hexyl, isohexyl, heptyl, octyl, 2-ethylhexyl, nonyl and decyl groups, of which those groups having from 1 to 6 carbon atoms are preferred, the methyl and ethyl groups being more preferred and the methyl group being most preferred. However, we particularly prefer that $R^1$, $R^2$, $R^3$, $R^4$ and $R^6$ should all represent hydrogen atoms.

Where A represents an alkylene group, this may be a straight or branched chain group having from 1 to 8 carbon atoms, and examples include the methylene, ethylene, propylene, trimethylene, tetramethylene, pentamethylene, hexamethylene, heptamethylene and octamethylene groups and such groups substituted by one or more alkyl groups. However, we prefer that A should be a direct bond, i.e. compounds of formula (Ia):

and especially such compounds where $R^1$, $R^2$ and $R^3$ all represent hydrogen atoms.

Specific examples of the unsaturated acid that may be represented by formula (I) or (Ia) include: acrylic acid, methacrylic acid, crotonic acid, isocrotonic acid, 2-, 3- and 4-pentenoic acid, 2-, 3-, 4- and 5-hexenoic acid, the heptenoic acids, the octenoic acids, the nonenoic acids, the decenoic acids, the undecenoic acids, the dodecenoic acids, the tridecenoic acids, the tetradecenoic acids, the pentadecenoic acids, the hexadecenoic acids, the heptadecenoic acids, the octadecenoic acids (especially oleic acid), the nonadecenoic acids and the icosenoic acids. Of these, the lower acids having from 3 to 6 carbon atoms are preferred, acrylic acid and methacrylic acid being most preferred.

In general, we do not prefer to use the esters of these acids, as they will be hydrolysed in the alkaline environment of an alkaline electrochemical cell and will thereby consume some of the alkali required to be present in the cell. However, provided the amount of homopolymer or copolymer is relatively small, as it normally would be, this may not be significant, or the cell may not be of the alkaline type, in which case it will not matter. In such a case, the nature of the ester is not critical. In any event, the nature of the salt is not critical, although salts with monovalent cations are preferred, and examples of the salts include: the alkali metal salts, such as the sodium and potassium salts; and ammonium salts. Examples of the esters include: lower alkyl esters, preferably having from 1 to 6 carbon atoms, such as the methyl, ethyl, propyl, isopropyl, butyl, isobutyl, t-butyl, pentyl and hexyl esters; and aryl esters, such as the phenyl and naphthyl esters.

In the aromatic compounds of formula (II), we prefer that $R^4$ should be a hydrogen atom or a methyl group, and that one of $R^5$ and $R^6$ should be a hydrogen atom and the other should be a hydrogen atom or an alkyl group having from 1 to 4 carbon atoms, preferably a methyl group. Most preferably, all of $R^4$, $R^5$ and $R^6$ represent hydrogen atoms.

$R^7$ can be a sulphonate or carboxylate group and a balancing cation, preferably a sulphonate group. There is no particular restriction on the nature of the balancing cation, and examples include: hydrogen atoms; and alkali metal atoms, such as sodium, potassium or lithium.

The position of the unsaturated group, $-CR^4\!\!=\!\!CR^5R^6$, relative to the sulphonate or carboxylate group $R^7$ is not critical. However, because of convenient availability of such compounds, we prefer that they should be para to each other.

A particularly preferred class of copolymers for use in the present invention are copolymers of an acid of formula (I) and a sulphonate of formula (II) (i.e. $R^7$ represents a sulphonate group) optionally with one or more other monomers. More preferred are copolymers of acrylic or methacrylic acid and a styrene sulphonate, optionally with one or more other monomers, and most preferred is a copolymer of acrylic acid and a styrene sulphonate, optionally with one or more other monomers, but preferably without other monomers. Most preferred is a copolymer of acrylic acid and sodium styrene sulphonate.

The relative proportions of the comonomers in the copolymer used in the present invention may vary over a wide range, for example, the molar proportion of the compound or compounds of formula (I) to the compound or compounds of formula (II) may vary from 0:100 (i.e. a homopolymer) to 90:10. However, these proportions do have an effect on the properties of the copolymer and its behavior in the separator of the present invention, and so a molar ratio of from 20:80 to 80:20 is more preferred.

In general, we have found that increasing the proportion of the compound of formula (I) in the copolymer increases the ionic conductivity. However, increasing proportions of the compound of formula (I) also leads to an increase in the solubility of the copolymer in the electrolyte, which is undesirable, and so it is necessary to strike a balance between these two factors. We therefore particularly prefer that the molar ratio of the compound or compounds of formula (I) to the compound or compounds of formula (II) should be in the range of from 20:80 to 60:40.

If other monomers than the compounds of formula (I) and (II) are present in the copolymer, it is preferred that they should be present in relatively minor amounts, generally, depending on the desired properties, less than 20% molar.

The homopolymers and copolymers employed in the present invention may be prepared by well known techniques that do not form part of the present invention, and are obvious to those skilled in the art.

The homopolymer or copolymer alone is preferably sprayed or printed as a solution or dispersion in situ in the cell or during the electrode assembly manufacturing process. The solvent or dispersant used is not critical, although it should be capable of dissolving or dispersing the copolymer and should not harm the anode or cathode or other components of the cell with which it may come into contact. Moreover, it is preferred that it should be relatively easy to remove, e.g. by evaporation, and it is also preferred that it should not be environmentally harmful or harmful to the health of workers who may come into contact with it.

Examples of suitable solvents or dispersants include: water and mixtures of water and an alcohol, for example methanol or ethanol.

Alternatively, a solution or dispersion of the polymer can be formed into a free-standing film on a suitable non-absorbent substrate, e.g. glass, and the solution can then be coagulated by the addition of a non-solvent for the copolymer such as an alkaline solution as discussed below to leave a porous free-standing film of the copolymer. This film may then, for example, be deposited between two flat planar electrodes prior to sealing the battery package or housing. The separator film is preferably at least 0.008 inches thick, and still more preferably, is bonded on each side by a 0.001 inch thick layer of the co-polymer solution that acts as an adhesive between the separator layer and each electrode. The adhesive layers are then preferably coagulated by the addition of an alkaline solution as described below.

As a further alternative, the copolymer may be deposited from the solution or dispersion by coagulation by adding a non-solvent for the copolymer. In a battery environment, where it is important to minimise the presence of unnecessary materials, it is preferred to use as the non-solvent a material that would naturally be present in the electrochemical cell. In this case, the preferred non-solvent is a solution of an alkali metal, preferably potassium or sodium, but most preferably potassium, hydroxide. The concentration of alkali metal hydroxide is preferably from 34% to 42% (w/w solution), and still more preferably 40% (w/w solution).

The amount of copolymer applied should be at least sufficient to provide an unbroken or mainly unbroken film, which is resistant to penetration by growing crystals of zinc oxide. The free-standing film is preferably at least 0.008 inches thick, and still more preferably the two adhesive layers are each 0.001 inch thick.

Alternatively, the copolymer may be supported on a porous substrate of the type commonly used as a separator in electrochemical cell technology. In this case, it may be applied as a coating to one or both sides, or it may be soaked into the substrate. In either case, it is applied as a solution or dispersion and then dried (by removal of solvent, e.g. by evaporation) or coagulated as described above.

Cell Contacts

Cell contacts present a design challenge for a number of reasons. It is desirable to be able to select the external contact materials without regard to the potential for unfavorable reactions between the external contacts and the materials utilized within the cell (such as electrolyte). Constraints imposed by the internal cell environment can interfere with the development of external tabs with the desired strength and current carrying properties. Further, leakage of electrolyte can be a problem with cells using aqueous electrolytes and metal structures for carrying current from the electrode to the external cell terminal. This leakage is a result at least in part of the propensity of electrolyte to travel, or "creep" along the metal surface of a current carrying structure that extends from the interior of the cell housing or package and through the sealed cell perimeter out to the external cell environment. We have discovered that an advantageous cell design employs a "discontinuous" current carrying system. As used herein, a "discontinuous" current carrying system exists where two distinct structures are employed for the purpose of carrying current between an electrode and the external cell terminal. One structure, referred to herein as a current collector, extends from the interior of the cell into the seal area and has a terminal end within the seal area or at the seal outer perimeter. A second external structure, referred to herein as the external terminal, extends from the external environment into the seal area, or contacts a conductive adhesive or epoxy that is positioned within the seal area. A conductive bridge, formed of direct contact between the two structures, or a conductive adhesive or epoxy that extends between the two structures, provides a pathway for current flow within the seal perimeter area. In this way, the cells of the within invention do not have a single metallic pathway for electrolyte creepage. The "seal area" as used herein includes the area of the cell packaging or housing material that is joined together using a pressure seal or heat seal or epoxy or other means of joining two sections together.

Figure 2:
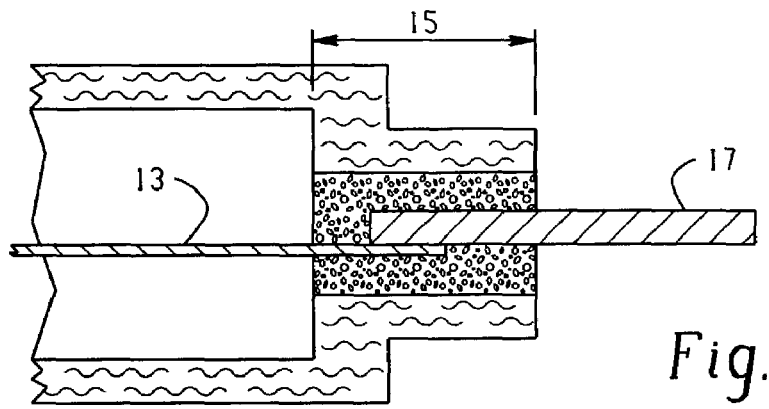
FIG. 2 is an electrochemical cell with cell contacts according to an embodiment of the within invention.
Figure 3:
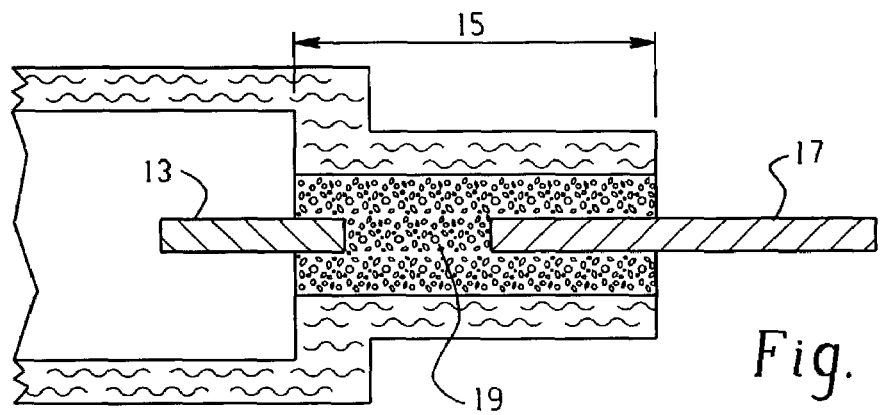
FIG. 3 is an electrochemical cell with cell contacts according to an alternate embodiment of the within invention.
Figure 4:
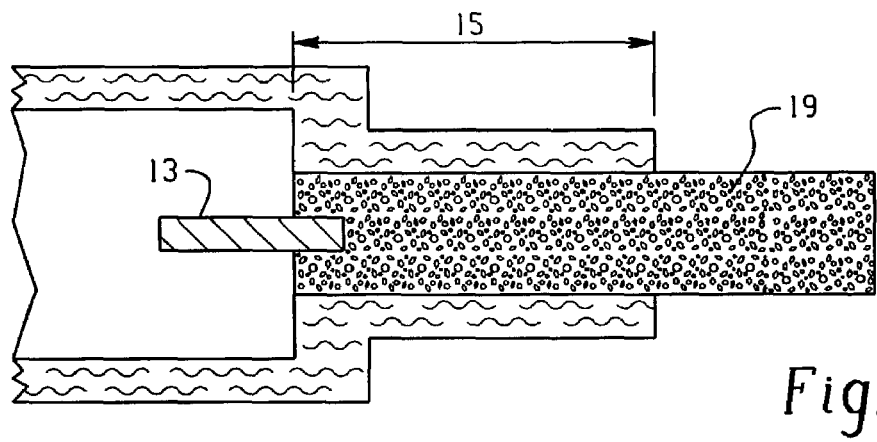
FIG. 4 is an electrochemical cell with cell contacts according to another alternate embodiment of the within invention.
Figure 5:
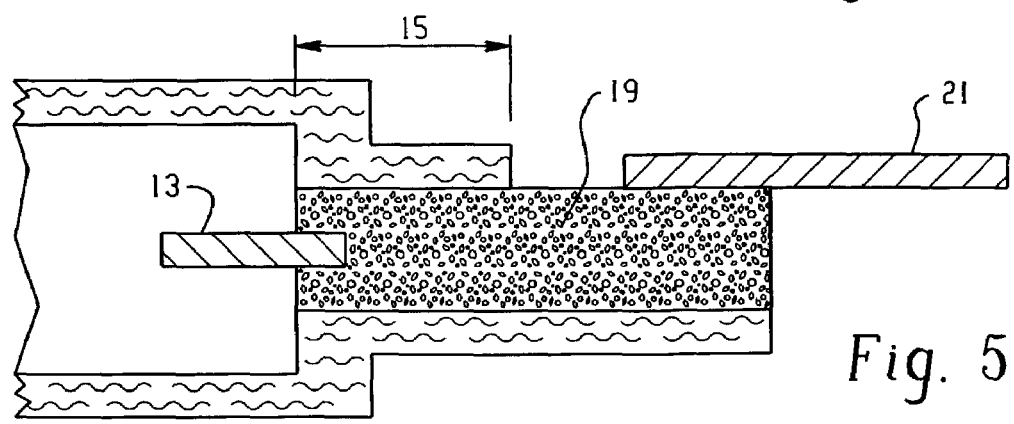
FIG. 5 is an electrochemical cell with cell contacts according to another alternate embodiment of the within invention.
Figure 6A:
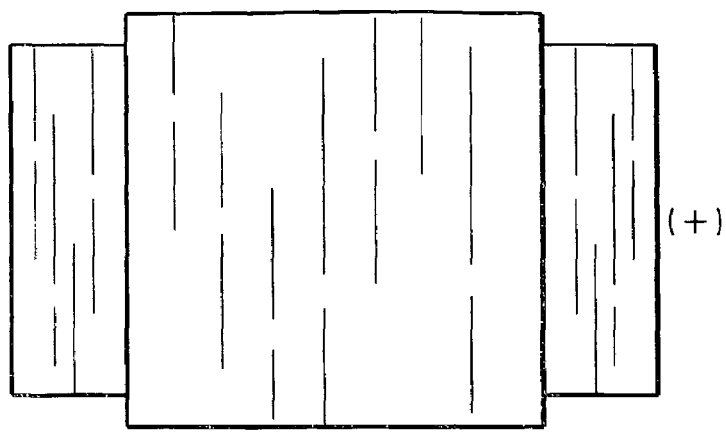
FIG. 6A is an electrochemical cell with cell contacts according to another alternate embodiment of the within invention.
Figure 6B:
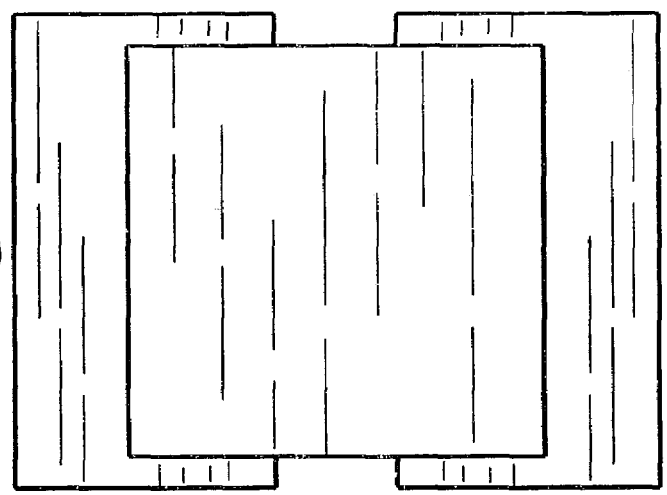
FIG. 6B is an electrochemical cell with cell contacts according to another alternate embodiment of the within invention.
Figure 6C:
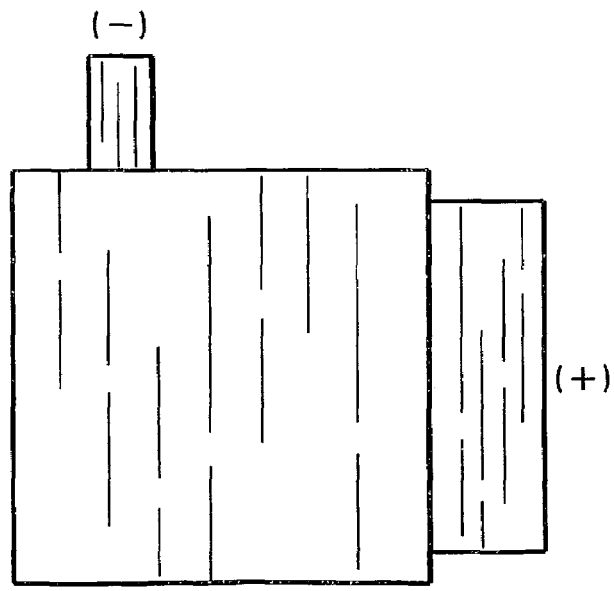
FIG. 6C is an electrochemical cell with cell contacts according to another alternate embodiment of the within invention.

In one embodiment depicted in FIG. 2, the current collector 13 for an electrode extends into the seal area 15, while a second metallic external terminal 17 extends into the sealing area and contacts the current collector 13 within the sealing area. In this embodiment, electrical conductivity for current flow is provided by the physical contact between the internal current collector and the external terminal. In a second embodiment depicted in FIG. 3, the current collector 13 and the external terminal 17 are not in physical contact. Electrical conductivity is provided by an electrically conductive adhesive or epoxy 19 located at least in part within the seal area 15 and bridging the two structures. In a third embodiment depicted in FIG. 4, the conductive adhesive or epoxy 19 extends to the area external to the cell and forms the external cell contact. In FIG. 5, the adhesive or epoxy 19 extends to the area external to the cell and contacts an external metallic tab or terminal 21. FIGS. 6A-6C illustrate further alternate embodiments of the external cell contact or terminal 17. In these embodiments, at least one of the external contacts has an increased surface area external to the cell packaging or housing. We have found that increasing the external contact surface area improves the discharge efficiency of the cell.

The anode and cathode external terminals or contacts are preferably printed onto a flexible nonconductive polymer substrate with a silver based conductive polymer ink such as Electrodag 479SS available from Acheson Colloids, Port Huron, Mich. The cathode collector is then printed onto the external cathode contact so that the collector and the external contact overlap in at least the seal area of the cell package or container. In the same manner, the anode ink is printed onto the external anode contact so that the anode and the external contact overlap in at least the seal area of the cell package or container.

At least a portion of the seal area includes an adhesive or epoxy for joining together two surfaces of packaging material to form the cell package or housing. The adhesive can be activated by heat or pressure or other means as is known in the art. Alternatively, the seal area can compromise an epoxy that forms a seal by a polymerization reaction initiated chemically, thermally or using photoinitiation or encapsulation as is known in the art. Use of a two part conductive epoxy can accommodate delays in manufacturing by avoiding epoxy curing during the delay.

Cell Assembly and Packaging

Initially, the external tabs for the electrodes are printed onto a flexible nonconductive polymer substrate that preferably forms the battery package. The zinc ink is formulated and applied directly to the substrate surface. The shape of the electrode is selected according to the cell design for the given application, as is known in the art. In a carbon zinc embodiment of the within invention, the zinc ink is printed onto the substrate using a silk screen, stencil or other suitable printing apparatus with a pattern that allows the ink to form an area that will interface with a cathode, and an area that will overlap a portion of the tab in the area that will be sealed to form the package. A suitable drying and/or curing protocol is engaged, depending on the ink formulation.

The ink for the cathode current collector is formulated and applied to a second section of flexible polymer substrate material, by stencil, screen or other suitable printing apparatus, followed by a suitable drying protocol. The second section of flexible polymer substrate material upon which the cathode current collector is printed may either be a section that allows for a co-planar arrangement between anode and cathode or a section that allows for a co-facial arrangement of anode and cathode. As used herein, "co-facial" electrodes share an interfacial area between a major anode surface and a major cathode surface. Co-facial electrodes are to be distinguished from "co-planar" electrodes, where a major anode assembly (anode+collector, if any) surface and a major cathode assembly (cathode+collector, if any) surface lie approximately in the same plane and are printed directly or indirectly onto a single piece of substrate material. The cathode current collector shape is selected so as to allow for sufficient contact with the cathode ink, and preferably also forms an area that will overlap a portion of the cathode tab in the seal area. The current collector ink is dried and then the cathode ink is printed onto the current collector and dried.

A separator is disposed between the anode and cathode in the case of electrodes in a co-facial arrangement. Electrolyte is introduced into the cell by way of separator paper soak up of free electrolyte or by way of a gel formulation that incorporates electrolyte or by way of electrode soak up of free electrolyte, or a combination thereof as is known in the art. The cell package or housing is then sealed together. In a preferred embodiment, the external contacts for the cell are discontinuous, as defined herein.

EXAMPLE 1

All Percents are by Weight Unless Otherwise Indicated

Figure 7:
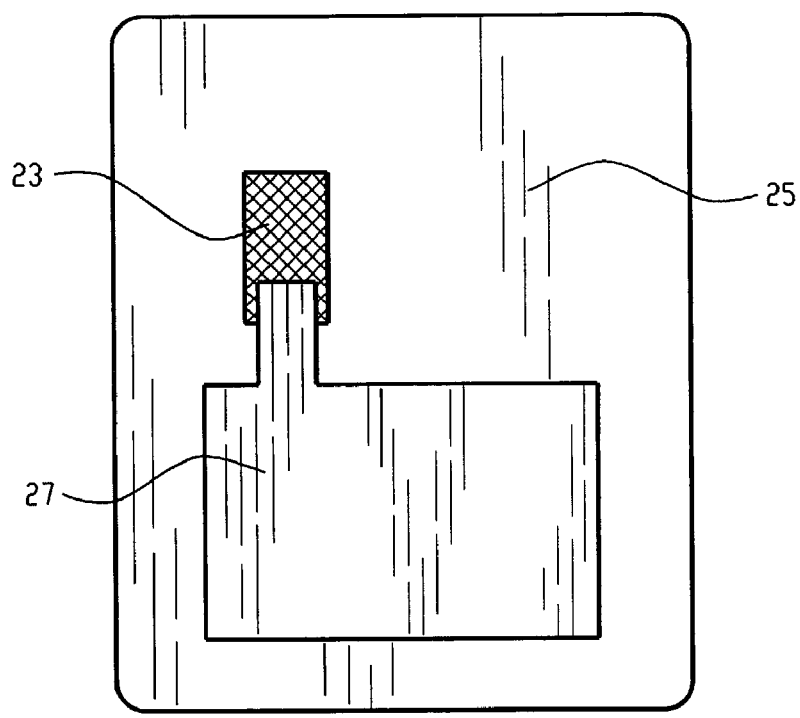
FIG. 7 is a printed anode and zinc mesh tab according to the within invention.

Cells were made according to this example. The anode ink wet formulation was 9.6 percent zinc acetate dihydrate, 31.7 percent water, 1.3 percent PVP (molecular weight of 2.2 to 2.8 million) and 57.4 percent zinc dust. The zinc ink was made by first combining the zinc acetate dihydrate obtained from Aldrich Chemical Company with water to form an aqueous solution. PVP was added to the aqueous solution to make a viscous salt-polymer solution. Zinc dust added and the mixture was stirred until homogeneous. The zinc dust was leaded with 0.16 percent lead. The zinc dust had a Microtrac average volumetric particle size, or d(50) value of about 10 microns. The mixture was allowed to stand to achieve the appropriate thickness, about 90 to 120 minutes. An anode was then screen printed by hand. The anode substrate was the inner heat sealable surface of a flexible polymer and metal laminate packaging material available from Pharma Center Shelbyville, product number 95014. The laminate comprises an inner heat sealable ethylene acrylic acid layer, a layer of aluminum, and an outer protective polymer layer. Four to five wet passes over the screen resulted in an anode 39 millimeters×37 millimeters with a thickness of about 0.087 millimeters. The anode was dried at 70° C. for five minutes. An anode tab 23 made of 0.002 inch thick zinc mesh was adhesively attached to the substrate 25 for place holding until the anode ink 27 was printed onto the substrate, overlapping one end of the tab and thereby affixing it to the substrate. See FIG. 7, illustrating the zinc mesh external tab 23 and the anode ink 27, prior to trimming the part for assembly into a cell. Alternatively, the anode tab 23 could also be printed silver ink.

Figure 8:
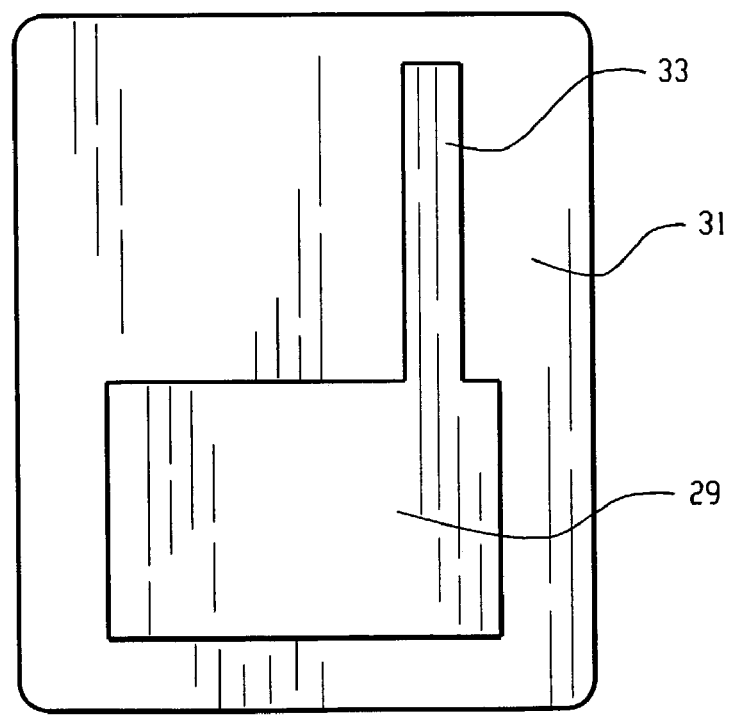
FIG. 8 is a printed cathode current collector and tab according to the within invention.

The cathode current collector ink was a carbon ink provided by Acheson Colloids, product number PF407C. The cathode collector 29 was stenciled onto the heat sealable surface of a discrete piece of the same laminate material 31 used for the anode substrate. The resulting collector that would contact the printed cathode was 40 millimeters×38 millimeters with a thickness of about 0.052 millimeters. A tab extension 33 was stenciled using the same cathode collector ink and extending from the collector. See FIG. 8. The cathode collector and tab extension was cured at 50° C. for 16 hours under vacuum to drive off the solvents used in the ink.

The cathode ink wet formulation was 1.1 percent polyvinylpyrrolidone (PVP), 44.4 percent water, 15.5 percent graphite and 38.8 percent manganese dioxide. A binder solution was mixed by combining the PVP and the water. The dry solid graphite KS6 (Timcal America, product designation Timrex LB 1099) and EMD (available from Chemetals and jet-milled by Sturtevant so that the Microtrac d(50) value is less than 1 micron) were crushed together to insure good mixing and then were added to the binder solution. The mixture was stirred by hand until smooth and homogeneous. The cathode was then stenciled onto the cathode current collector to a size of 40×38×0.139 millimeters, and cured at 70° C. for five to ten minutes.

A coated kraft separator paper with a thickness of about 95 microns is used. The separator base paper is available from Munksjo #300542, and is coated at a level of 20 grams per square meter (gsm) with a mixture of starch (83.6 weight percent available from Roquette LAB2469), gel (7.9 weight percent available from Courtlands B1209), PVP (2.1 weight percent), surfactant (1.4 weight percent ethyl tallow amine known commercially as Crodamet) and water (5 weight percent). The paper was wetted with the cell electrolyte, a 28 percent by weight zinc chloride solution with 1000 ppm Cetrimide BP (cetyl trimethyl ammonium bromide, available from ABA Chemical Ltd., Cheshire, England) and 600 ppm lead chloride added to the solution. The electrolyte solution is filtered to remove solids prior to use. The electrode surfaces were also wetted with the electrolyte so that a total of between 0.7 and 0.8 grams of electrolyte was incorporated into the cell. The separator was placed onto either electrode and oriented such that the coated side of the separator faced the zinc anode. The electrode substrates were trimmed to an appropriate size and the cell was heat sealed around the perimeter, such that the electrode tabs extended beyond the heat seal to the exterior of the cell package. Since the packaging laminate, upon trimming, exposed an edge of the inner aluminum foil layer, a strip of polyethylene was wrapped around the anode tab to insure against shorting between the aluminum and the zinc ink.

Two of these cells were connected in series to a printed circuit and powered an LED and sound card application with a current drain of 8 mA. In addition, several of these cells were discharged for at least 100 cycles, where a cycle is defined as 8 mA for 16 seconds on and 0 mA (no drain) for 60 seconds.

EXAMPLE 2

Figure 9:
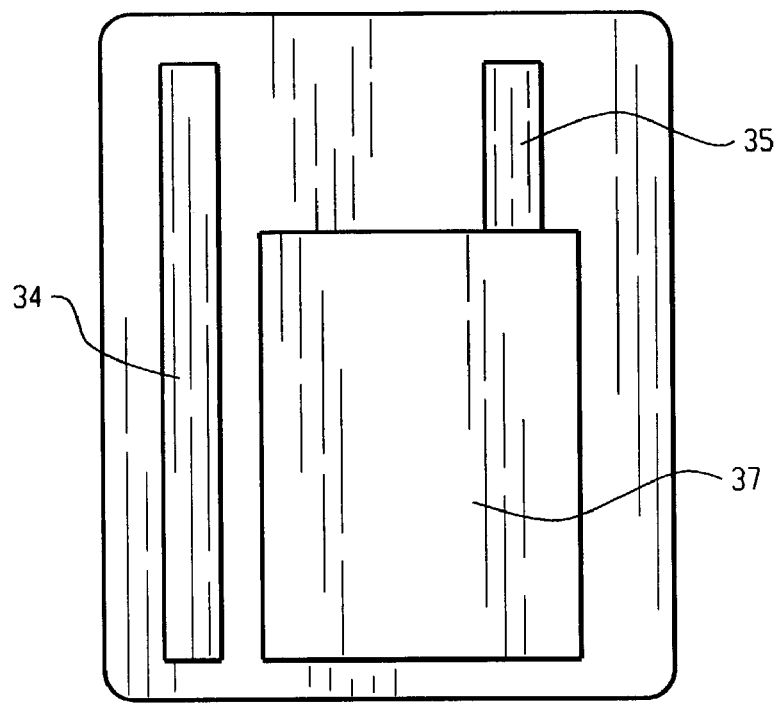
FIG. 9 is a co-planar printed anode and cathode according to the within invention.

Co-planar electrode assembly cells were constructed according to this example. An anode was printed using the same anode ink formulation and substrate as in Example 1, and a 0.002 inch thick zinc mesh anode current collector as in Example 1 was affixed to the substrate in the same manner as in Example 1. The anode 34 was screen printed to a size of 50.4 millimeters×6.8 millimeters with an average thickness of 109 millimeters. The cathode current collector and cathode were stenciled using the same formulation as in Example 1 onto the same substrate as the anode to form a co-planar electrode arrangement. The cathode current collector 35 was stenciled to a size of 40 millimeters×27 millimeters×0.036 millimeters, while the cathode ink 37 was stenciled onto the current collector with a thickness of 0.166 millimeters. See FIG. 9. The gap between the cathode and the anode was 2.0 millimeters. The electrode surfaces were wetted up with the same electrolyte as in Example 1, and the same separator paper as in Example 1 was introduced to provide an electrolyte soakup such that a total of 0.6 to 0.7 grams of electrolyte was introduced into the cell. The separator paper in this co-planar arrangement is sized to cover both the anode and the cathode.

The substrate was trimmed to the appropriate size and a second piece of the packaging material was placed over the first so that the heat sealable surfaces face each other, as in Example 1, and the two are sealed together around the cell perimeter, exposing the tabs for the anode and cathode to the external environment of the cell.

Two cells were connected in series to a printed circuit and powered a sound card application with a current drain of 2 mA. In addition, several cells were discharged for at least 100 cycles, where a cycle is defined as 2 mA for 6 seconds on and 0 mA (no drain) for 60 seconds.

EXAMPLE 3

Co-facial electrode assembly cells were constructed as follows. A zinc mesh anode was utilized in the cells of this example, consisting of a 0.005 inch thick piece of zinc mesh available from Delkar Corporation. The mesh was cut to 39 millimeters×37 millimeters and adhered to the same substrate material as in Examples 1 and 2. The anode current collector was formed from this zinc mesh also and adhered to the substrate in the same manner.

The cathode current collector for the cells of this example used the same carbon ink as in Example 1, and was stenciled as in Example 1 to a size of 40 millimeters×38 millimeters with an average thickness of 0.052 millimeters on the same substrate material as in Example 1. The cathode ink was the same ink formulation as in Example 1, and was stenciled onto the collector as in Example 1 to an average thickness of 0.149 millimeters. The same separator material was used as in Example 1 and the same electrolyte as in Example 1 was introduced into the cell by wetting the cathode surface and the separator so as to introduce an average of 0.743 grams of electrolyte into the cell. The two substrates were then joined together by heat sealing.

Three cells were connected in series to a printed circuit and powered an electroluminescent display with a current drain of about 15 mA.

EXAMPLE 4

Zinc Chloride Electrolyte Cells with an Aqueous Zinc Ink Co-Solvent Formulation

Cells were constructed utilizing an aqueous zinc ink formulation with a co-solvent system in accordance with the within invention. The cells had a printed zinc anode, a printed manganese dioxide cathode, a zinc chloride electrolyte and a coated kraft paper separator as described above. The electrolyte was a 28 weight percent zinc chloride solution to which 600 ppm lead chloride and 1000 ppm cetyltrimethylammoniium bromide (available from Aldrich)

was added. This solution was filtered to remove solids prior to introduction into the cells. A co-solvent system comprising water and NMP was utilized with a PVP binder in the zinc ink formulation. The anode zinc ink general formulation was 8.6 grams Union Miniere zinc dust (1600 ppm lead) with a laser median diameter of 10.2 microns, 0.2 grams PVP K-120, 4.5 mL 1.4 molar zinc acetate aqueous solution and 0.5 mL NMP. The cathode ink general formulation was 7 grams Chemetals jet-milled EMD (d(50)<1 micron, d(90) <3 microns), 2.8 grams synthetic graphite KS6, 0.2 grams PVP K-120 and 10 mL water. The actual zinc and EMD inputs per cell are listed in Table VI. The anode tab silver ink (Acheson Colloids, Electrodag 479SS, except where otherwise noted) and the cathode tab and current collector ink (Acheson Colloids, Electrodag PF407C) were printed onto the sealing surface of a metal laminated packaging material available from Pharma Center Shelbyville, product number 95014, and dried. The cathode ink and the anode ink as described above were printed onto the respective collectors and the cells were assembled into a co-facial arrangement and a separator was placed between the electrodes. The cells were trimmed, heat sealed along three sides, about 0.7 to 0.8 grams of the electrolyte was dispensed into the cell and the cell was sealed. The cells were discharged for 100 cycles and the results are presented in Table VII:

TABLE VII

| Anode: Zinc input (gm.) | Cathode: EMD input (gm.) | Tests and Observations |
|---|---|---|
| 0.2685 | 0.1505 | Pass 8 mA pulse test for 100 cycles @ 16 sec. on/60 sec. off. CCV at the $100^{th}$ cycle is 1.21 V |
| 0.2891** | 0.1575** | Pass 15 mA pulse test for 100 cycles @ 16 sec. on/60 sec. off. CCV at the $100^{th}$ cycle is 1.15 V |
| 0.3342** | 0.1855** | Pass 15 mA pulse test for 100 cycles @ 16 sec. on/60 sec. off. CCV at the $100^{th}$ cycle is 1.16 V |
| *0.4371** | 0.1820** | Pass 15 mA pulse test for 100 cycles @ 16 sec. on/60 sec. off. CCV at the $100^{th}$ cycle is 1.00 V |

*includes zinc for external contact tab; same printed zinc ink as was used for the anode
**separator paper coating included cetyltrimethylammonium bromide available commercially as Cetrimide

EXAMPLE 5

Cells Using a Zinc Acetate Electrolyte

Cells were constructed utilizing a zinc acetate electrolyte solution with printed anodes and cathodes. The general formulation for the printed zinc ink anode was 8.6 grams Union Miniere zinc dust (1600 ppm lead) with a laser median diameter of 10.2 microns, 0.2 grams PVP K-120 and 5.0 mL 1.4 molar zinc acetate aqueous solution. The actual zinc input per cell is indicated in Table VIII. The non-aqueous cathode ink formulations are as noted in the table—jet-milled EMD (purchased from Chemetals product K60 and jet-milled by Sturtevant, Inc., in Hanover, Mass.) with an average particle size of between 0.3 and 1.0 microns and non-milled EMD (purchased from Kerr McGee) with an average particle size of about 40 microns are both used in these cells. The anode was printed directly onto the packaging laminate as in Example 1. The cathode collector and the anode and cathode tabs consisted of printed silver ink (Electrodag 479SS from Acheson Colloids). The cells were assembled into a co-facial electrode assembly with a coated kraft paper separator as described in example 8. The cells were partially sealed, the electrolyte was introduced and the cells were completely sealed. The results of a signature discharge test are reported in Table VIII, where a signature discharge test is defined in general as a discharge sequence from high to low rate with a 30 minute rest time in between each discharge.

TABLE VIII (zinc acetate electrolyte cells)

| Anode: zinc input (gm.) | Cathode: EMD input (gm.) | Tests and Observations |
|---|---|---|
| .2134 | $^A$.667 | Signature test: Cathode eff. 10.57% @ 20 mA/1.43 mA/cm$^2$ Cathode eff. 3.23% @ 10 mA/0.71 mA/cm$^2$ Cathode eff. 3.50% @ 5 mA/0.36 mA/cm$^2$ Cathode eff. 6.56% @ 2 mA/0.14 mA/cm$^2$ Cathode eff. 6.00% @ 1 mA/0.07 mA/cm$^2$ |
| .2573 | $^A$.7383** | Signature test: Cathode eff. 11.21% @ 20 mA/1.43 mA/cm2 Cathode eff. 3.75% @ 10 mA/0.71 mA/cm2 Cathode eff. 3.74% @ 5 mA/0.36 mA/cm2 Cathode eff. 7.64% @ 2 mA/0.14 mA/cm2 Cathode eff. 8.08% @ 1 mA/0.07 mA/cm2 |
| .1658 | $^B$.1925 | Signature test: Cathode eff. 27.57% @ 20 mA/1.43 mA/cm$^2$ Cathode eff. 28.40% @ 10 mA/0.71 mA/cm$^2$ Cathode eff. 3.23% @ 5 mA/0.36 mA/cm$^2$ Cathode eff. 3.28% @ 2 mA/0.14 mA/cm$^2$ Cathode eff. 1.75% @ 1 mA/0.07 mA/cm$^2$ |
| .1927 | $^B$.2029** | Signature test: Cathode eff. 56.73% @ 20 mA/1.43 mA/cm$^2$ Cathode eff. 4.85% @ 10 mA/0.71 mA/cm$^2$ Cathode eff. 4.55% @ 5 mA/0.36 mA/cm$^2$ Cathode eff. 5.35% @ 2 mA/0.14 mA/cm$^2$ Cathode eff. 3.48% @ 1 mA/0.07 mA/cm$^2$ |

$^A$General cathode ink formulation: 9.2 grams Kerr McGee non-milled EMD, 0.6 grams synthetic graphite KS6, 0.2 grams Kureha 1100 PVDF binder, 3.3 mL NMP solvent.
$^B$General cathode formulation: 7.0 grams jet-milled EMD, 2.8 grams synthetic graphite KS6, 0.2 grams Hureha 1100 PVDF, 8 mL NMP.
**Separator paper coating included cetyltrimethylammonium bromide available commercially as Cetrimide.

EXAMPLE 6

Co-Planar Cell with Gelled Zinc Chloride Electrolyte

Figure 10:
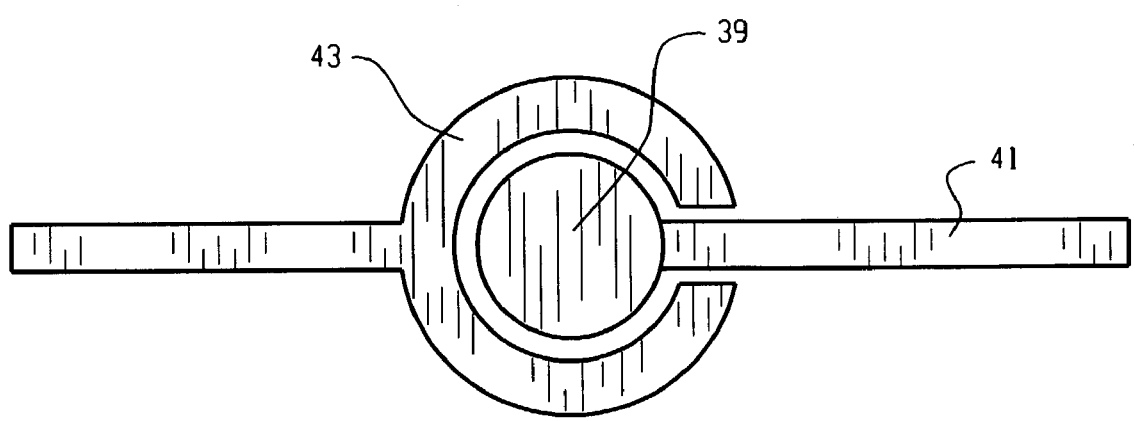
FIG. 10 is a circular co-planar anode and cathode according to the within invention.

A gelled electrolyte was prepared as follows: a 6.0 weight percent Galactasol solution was gradually added to 28% $ZnCl_2$ solution contained in a beaker. The solution was stirred with a magnet bar to mix the electrolyte. Then the gelled electrolyte was left at room temperature overnight to let the trapped air escape. The degassing process could be speeded up by putting the gelled electrolyte in a vacuum oven. Coplanar cells with circular electrodes were constructed as follows: Circular cathodes 39 with a diameter of ⅜ inch (9.525 mm) were printed on a strip 41 of Grafoil manufactured by UCAR, Inc. (ca. 25 mm×100 mm, 0.142 mm) with stencils. The printed cathode thickness varies from 0.002 inches to 0.008 inches. Then the Grafoil strips with dried cathodes were trimmed to fit the cathode size with a narrow tab as the current collector as demonstrated in FIG. 10. A piece of zinc foil with 0.003 inch thickness was cut to a shape as the anode 43. Then the cathode 39 and the anode 43 were placed on a piece of book tape. The gap between the cathode and the anode was about 1 millimeter. The Galactasol gelled electrolyte was placed on the top of the electrodes. Finally, another piece of book tape was placed on the top of the assembly to seal the cells.

Figure 11:
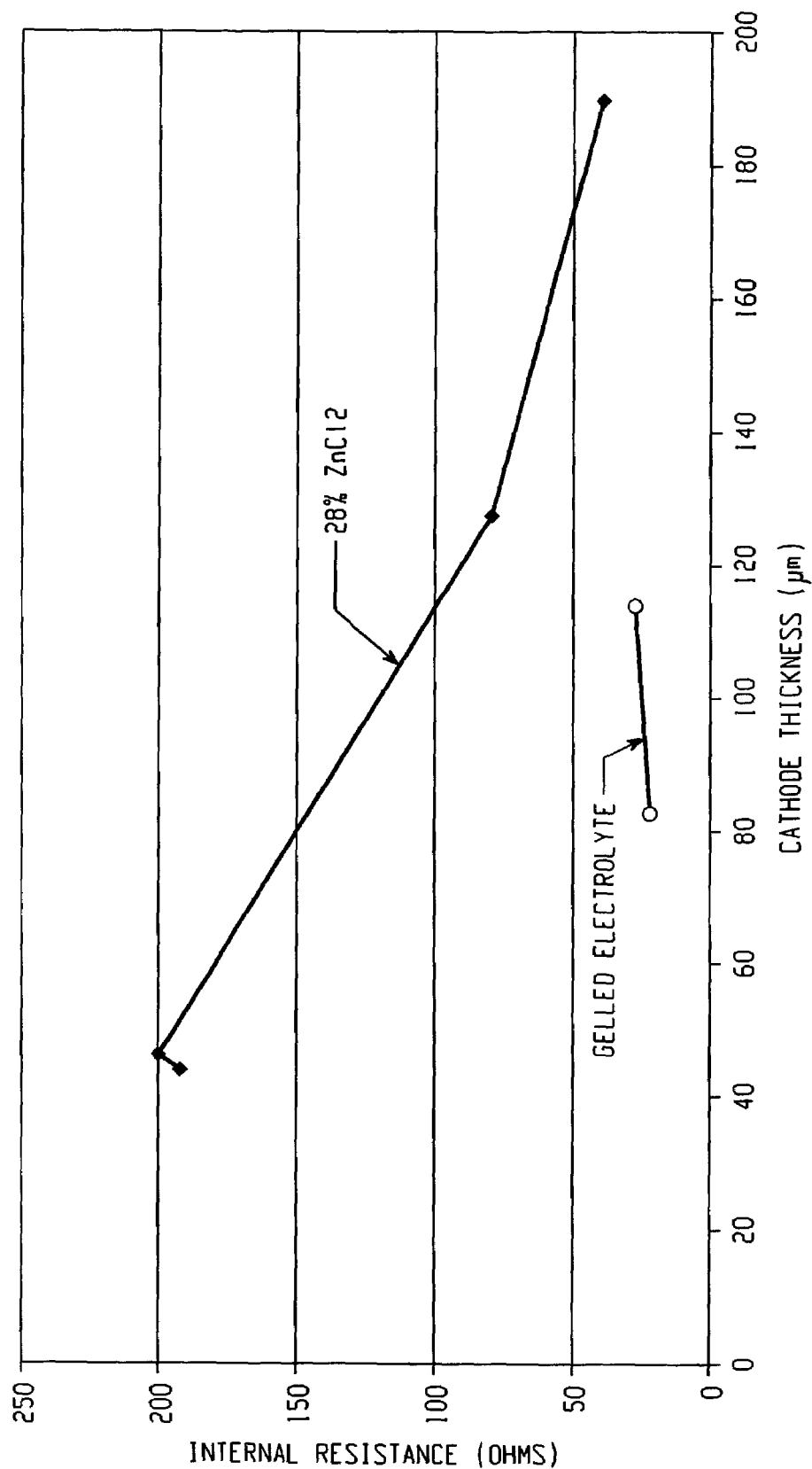
FIG. 11 is a graph of internal resistance for cells using a gelled electrolyte versus a liquid electrolyte.

The cell internal resistance was determined by AC impedance after the cells were equilibrated for a few hours. FIG. 11 shows that the cells with the gelled electrolyte have a much lower resistance than the cells with the liquid electrolyte with separator. Some of the cells were discharged at 2 mA, 6 seconds on, 60 seconds off to 0.9 V cut-off. All of the cells lasted at least 180 cycles.

with the wet co-polymer layers additionally providing adhesive properties. The free-standing film was formed by applying a doctor blade to the above gel on glass and coagulating the film by dipping the glass into a 37-40 weight percent potassium hydroxide bath.

The general dry anode ink formulation without excess +2 zinc ions was: 2 weight percent PEO (MW=600,000) and 98 weight percent leaded zinc (500 ppm) dust sieved to pass through a 56 micron sieve opening but not pass through a 32 micron sieve opening. The general dry anode ink formulation with excess +2 zinc ions was: 1.6 weight percent PEO, 19.8 weight percent zinc chloride and 78.6 weight percent leaded zinc as above described. The general dry cathode ink formulation was 10 weight percent PEO, 6 weight percent graphite and 84 weight percent jet-milled EMD with a Microtrac d(50) of less than 1 micron. Actual zinc and EMD inputs are listed in Table IX below.

The anode ink in each case was printed directly onto the Pharma substrate described above, slightly overlapping a silver external tab printed onto the same substrate using the silver ink as described in Example 8. The cathode ink in each case was printed directly onto a printed silver cathode current collector. The cathode current collector silver ink was printed directly onto a second piece of the Pharma substrate described above and is the same silver ink described in Example 8, extending to a point on the substrate that will be external to the cell package seal area, forming the external cathode tab. The cells were assembled, sealed on three sides and a 40 weight percent potassium hydroxide solution was added to the cell, coagulating the polymer separator layers and wetting the electrodes. The cells were then sealed along the fourth edge exposing the silver electrode external tabs to the environment and the cells were subjected to a pulsed discharge to a 0.9 volt cutoff at 10 mA for 60 second on and a 5 second rest.

TABLE IX (alkaline cells with co-polymer separator and zinc ink having excess +2 zinc ions)

| | Anode input (grams zinc) | Cathode input (grams EMD) | Polymer separator | Test results |
|---|---|---|---|---|
| Lot 4241-1 | .8367 | .1073 | .008 inches | IR drop (180 mV) > mass transfer > activation |
| Lot 4241-2 | .5856 | .1364 | .024 inches | IR drop (120 mV) > mass transfer > activation |
| Lot 4241-3 | .6315 | .2036 | .008 inches | Mass transfer > IR drop (20 mV) > activation |
| Lot 4241-4 | .6497 | .1840 | .024 inches | Mass transfer > IR drop (80 mV) > activation |

EXAMPLE 7

Alkaline Cells with a Polymer Separator and a Zinc Ink Having Excess +2 Zinc Ions Co-facial cells were constructed with and without the addition of excess +2 zinc ions to the anode ink formulation to compare performance. All the cells included a copolymer separator comprising a 20:80 molar ratio of acrylic acid and sodium styrene sulphonate. The gel is formed by combining the copolymers in the above molar ratio with water so that the resulting solution is 20 weight percent copolymer, 80 weight percent water. The anode and the cathode are each initially coated with the copolymer gel to form an adhesive layer approximately 0.001 inch thick. While these layers are still wet, a free-standing co-polymer film of a thickness as indicated in Table IX was placed onto one of the wet layers and the cell was then assembled in a co-facial arrangement, The addition of zinc chloride into the zinc ink increases the printed anode conductivity and lowers the ohmic resistance.

EXAMPLE 8

Sound Card Circuit

A printed cell is assembled as follows: initially, a cathode collector is printed onto the sealing surface of a single sheet of a metal laminated packaging material available from Pharma Center Shelbyville, product number 95014, and dried. The cathode current collector is Electrodag PF-407C, a carbon polymer ink available from Acheson. The cathode collector is printed to a dry thickness of 36 microns×27 millimeters×40 millimeters. Next, silver external tabs for the anode and cathode are printed onto the sealing surface of the same sheet of metal laminate and dried. The cathode tab overlaps the cathode current collector ink already deposited onto the metal laminate surface. The silver ink is Acheson 479SS, and each tab has a dry dimension of 32.3 millimeters×11.0 millimeters×10.0 microns thick, and is separated from the other by 11 millimeters. An anode is printed on the same laminate sheet. The anode is a zinc ink with a wet composition of 57.35 weight percent Union Miniere zinc dust with a laser median diameter of 10 microns as reported by the manufacturer, 1.33 weight percent PVP, 31.74 weight percent water and 9.58 weight percent zinc acetate available from Aldrich as $Zn(OOOCH_3)_2.2H_2O$. The ink is made by first mixing the aqueous zinc acetate solution first, then dissolving the PVP into the solution, and finally adding the zinc dust and stirring until homogeneously mixed. The anode is printed onto the substrate material, overlapping the silver anode tab already deposited on the sealing surface of the metal laminate to a dry thickness of 100 microns×6 millimeters×38.6 millimeters. One of skill in the art will recognize that the order of printing can be changed, and the silver external tabs can be printed initially directly onto the sealing surface without departing from the scope of the within invention.

The cathode manganese dioxide ink is then formulated. The wet formulation is 36.84 weight percent jet-milled Chemetals electrolytic manganese dioxide (EMD) with a d(50) particle size as determined with a treated Microtrac sample of less than 1 micron, 1.05 weight percent PVP, 14.74 weight percent KS6 and 47.37 weight percent water. The ink is made by pre-mixing the EMD with the KS6, pre-dissolving the PVP into the water, and then adding the powder mix into the polymer solution and stirring until a homogeneous mixture is obtained. The cathode is printed onto the current collector to a dry thickness of 190 microns×28 millimeters×40.6 millimeters and dried.

Coated kraft separator paper with a dry thickness of 0.089 to 0.114 millimeters×40 millimeters×43.6 millimeters is placed over the electrodes. The separator base paper is available from Munksjo #300542, and is coated at a level of 20 grams per square meter (gsm) with a mixture of starch (83.6 weight percent available from Roquette LAB2469), gel (7.9 weight percent available from Courtlands B1209), PVP (2.1 weight percent), surfactant (1.4 weight percent ethyl tallow amine known commercially as Crodamet) and water (5 weight percent). A second sheet of laminate packaging material is placed over the electrode assembly and the package is trimmed and heat sealed along three edges. Electrolyte in the amount of 0.6 grams is added to the package. The electrolyte is a 28 weight percent zinc chloride solution to which 600 ppm lead chloride and 1000 ppm cetyltrimethylammonium bromide are added. The final solution is then filtered to remove solids prior to use. After the electrolyte is added, the cell is heat sealed along the remaining edge and trimmed to the desired outer dimension.

Figure 12:
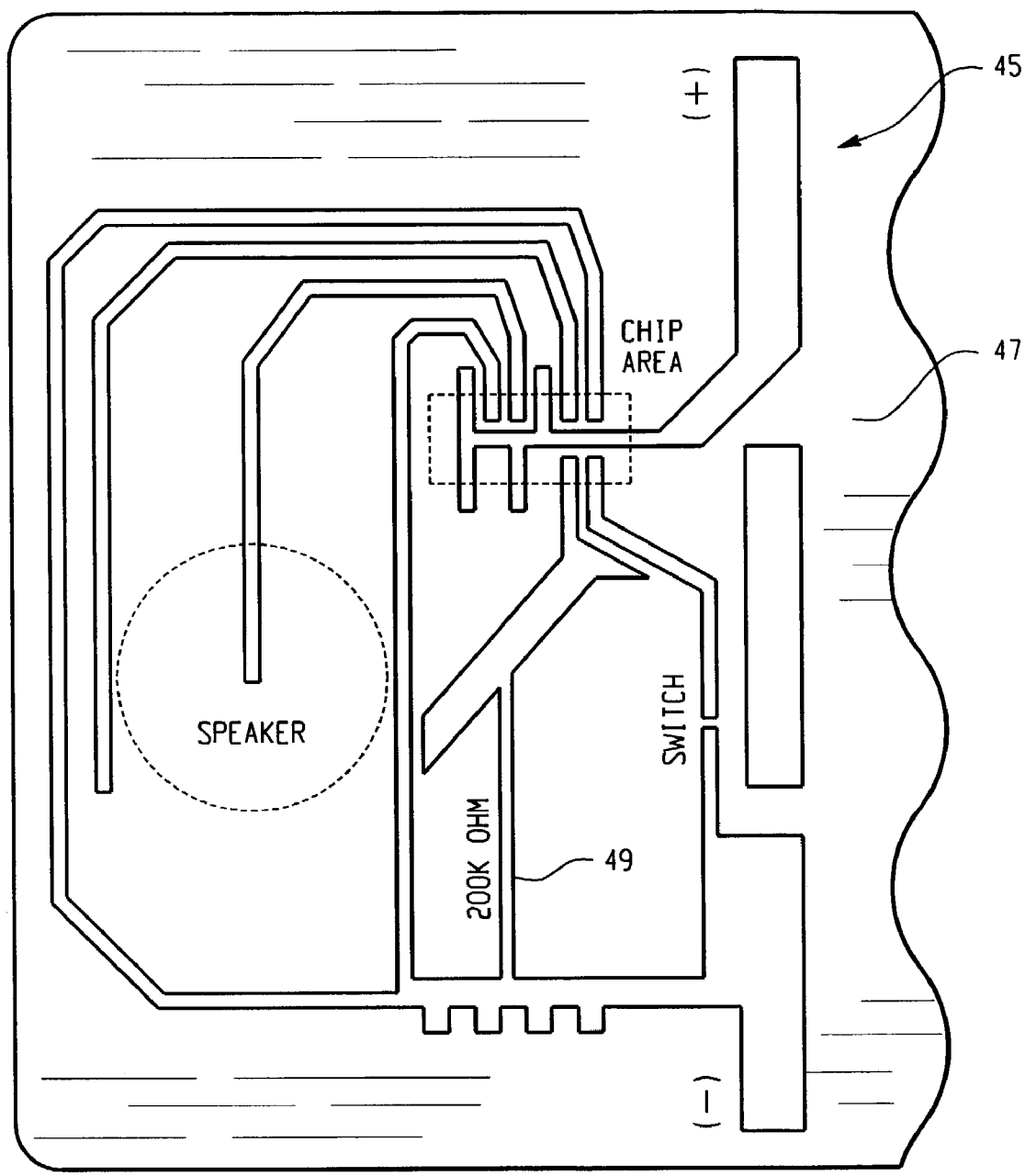
FIG. 12 is the printed circuitry for a sound card device powered by a printed cell according to the within invention.
Figure 13:
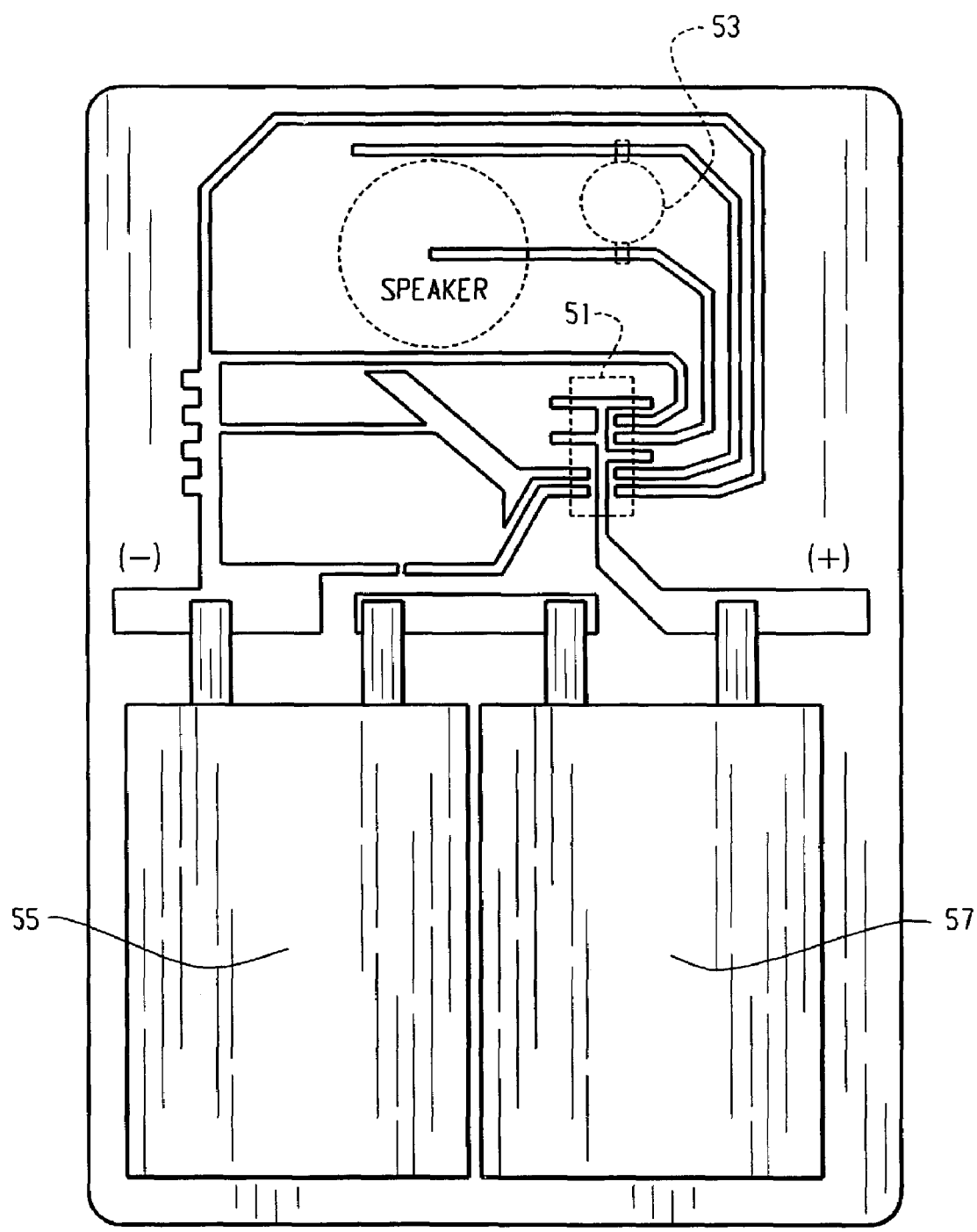
FIG. 13 is the final circuit for a sound card device powered by a printed cell according to the within invention.

A circuit 45 is screen printed to a thickness of 8-12 microns onto a 0.010 inch thick polyester film 47 available from Melinex #454 (see FIG. 12) using the Acheson silver ink (Electrodag 479SS) in a solvent of diethylene glycol monoethyl ether acetate and dried. A 200,000 ohm resistor 49 is printed to a thickness of 10 to 15 microns onto the circuit using Acheson carbon ink (Minico M 301401 RS) in a bisolvent of ethylene glycol monobutyl ether acetate and isophorene (see FIG. 12). A sound chip 51 available from Holtek (HT81R03) and a piezoelectric speaker 53 available from Star Micronics (QMB 105PX) are affixed to the circuit using silver epoxy available from Circuit Works (CW 2400). A switch is assembled using zinc foil on double stick tape and connected to the circuit. Two cells 55, 57 are connected to the circuit using the silver epoxy and the device is completed and ready for operation. See FIG. 13.

Although only a few embodiments of the present invention have been described above, it should be appreciated that many modifications can be made without departing from the spirit and scope of the invention. For example, although the foregoing discussion of a thin preferably flexible battery focuses on a single anode coupled to a single cathode, the skilled artisan will appreciate that any number of anode and cathode couples, either in parallel or in series or both, can be incorporated within the battery without departing from the scope of the within invention.

What is claimed is:

1. A flat flexible battery comprising an electrode, at least one electrode internal current collector having first and second ends and at least one electrode external terminal having first and second ends, and a flexible nonconductive packaging material, said packaging material sealed together at at least one seal junction to form a seal area and a sealed housing surrounding said electrode, wherein said internal current collector and said external terminal are discrete structures, and wherein said internal current collector first end contacts said electrode, said internal current collector second end is positioned within said seal junction, said external terminal first end is positioned within said seal junction and said external terminal second end is positioned external said seal junction and external said housing wherein said internal current collector and said external terminal are not in physical contact within said seal junction.

2. The battery of claim 1, further comprising an electrically conductive medium disposed between the second end of the internal current collector and the first end of the external terminal.

3. The battery as defined in claim 2, wherein the electrically conductive medium comprises electrically conductive adhesive.

4. The battery as defined in claim 2, wherein the electrically conductive medium comprises epoxy.

* * * * *